(12) United States Patent
Frascati et al.

(10) Patent No.: US 9,799,088 B2
(45) Date of Patent: Oct. 24, 2017

(54) RENDER TARGET COMMAND REORDERING IN GRAPHICS PROCESSING

(71) Applicant: QUALCOMM Incorporated, San Diego, CA (US)

(72) Inventors: Christopher Paul Frascati, Oviedo, FL (US); Murat Balci, Orlando, FL (US); Avinash Seetharamaiah, Chuluota, FL (US); Maurice Franklin Ribble, Lancaster, MA (US); Hitendra Mohan Gangani, Orlando, FL (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/465,371

(22) Filed: Aug. 21, 2014

(65) Prior Publication Data

US 2016/0055608 A1   Feb. 25, 2016

(51) Int. Cl.
| | |
|---|---|
| *G06T 1/00* | (2006.01) |
| *G06T 15/00* | (2011.01) |
| *G06T 1/20* | (2006.01) |
| *G06T 1/60* | (2006.01) |
| *G09G 5/18* | (2006.01) |
| *G06F 9/44* | (2006.01) |

(52) U.S. Cl.
CPC .............. *G06T 1/20* (2013.01); *G06F 9/4443* (2013.01); *G06T 1/60* (2013.01); *G06T 15/005* (2013.01); *G09G 5/18* (2013.01)

(58) Field of Classification Search
None
See application file for complete search history.

(56) References Cited

U.S. PATENT DOCUMENTS

| | | | |
|---|---|---|---|
| 7,489,318 B1 | 2/2009 | Wilt | |
| 8,228,328 B1 | 7/2012 | French et al. | |
| 8,269,780 B2* | 9/2012 | Swift | G06F 9/5044 |
| | | | 345/501 |
| 8,509,569 B2* | 8/2013 | Weiss | H04N 1/62 |
| | | | 382/302 |
| 2008/0141131 A1* | 6/2008 | Cerny | G06F 11/3612 |
| | | | 715/716 |
| 2009/0201303 A1 | 8/2009 | Westerhoff et al. | |

(Continued)

OTHER PUBLICATIONS

Capin, T., et al., "The State of the Art in Mobile Graphics Research", IEEE Computer Graphics and Applications, vol. 28, No. 4, Jul. 1, 2008 (Jul. 1, 2008), pp. 74-84, XP011229506, IEEE Service Center, New York, NY, US ISSN: 0272-1716, DOI: 10.1109/MCG.2008.83 abstract.

(Continued)

*Primary Examiner* — Jacinta M Crawford
(74) *Attorney, Agent, or Firm* — Shumaker & Sieffert, P.A.

(57) ABSTRACT

In an example, a method for rendering graphics data includes receiving a plurality of commands associated with a plurality of render targets, where the plurality of commands are received in an initial order. The method also includes determining an execution order for the plurality of commands including reordering one or more of the plurality of commands in a different order than the initial order based on data dependencies between commands. The method also includes executing the plurality of commands in the determined execution order.

30 Claims, 11 Drawing Sheets

(56) References Cited

U.S. PATENT DOCUMENTS

| | | | |
|---|---|---|---|
| 2010/0164983 A1 | 7/2010 | Lawrence et al. | |
| 2011/0063313 A1* | 3/2011 | Bolz | G06T 15/005 345/531 |
| 2012/0017069 A1* | 1/2012 | Bourd | G06F 9/3838 712/216 |
| 2013/0127891 A1* | 5/2013 | Kim | G06T 15/00 345/582 |
| 2013/0135341 A1* | 5/2013 | Seetharamaiah | G06T 15/005 345/619 |
| 2014/0118362 A1 | 5/2014 | Hakura et al. | |
| 2014/0184623 A1 | 7/2014 | Frascati et al. | |
| 2014/0354644 A1* | 12/2014 | Nystad | G06T 1/20 345/426 |

OTHER PUBLICATIONS

International Search Report and Written Opinion—PCT/US2015/043466—ISA/EPO—dated Oct. 20, 2015 (13 pages).
Second Written Opinion form corresponding Application Serial No. PCT/US2015/043466 dated Aug. 4, 2016 (8 pages).
Reply to Second Written Opinion from corresponding PCT Application Serial No. PCT/US215/043466 filed on Oct. 4, 2016 (4 pages).
International Preliminary Report on Patentability from corresponding PCT Application Serial No. PCT/US2015/043466 dated Nov. 29, 2016 (19 pages).

* cited by examiner

RENDER TARGET COMMAND REORDERING IN GRAPHICS PROCESSING

TECHNICAL FIELD

This disclosure relates to rendering graphics processing.

BACKGROUND

A device that provides content for visual presentation on an electronic display generally includes a graphics processing unit (GPU). The GPU renders pixels that are representative of the content on a display. The GPU generates one or more pixel values for each pixel on the display and performs graphics processing on the pixel values for each pixel on the display to render each pixel for presentation.

SUMMARY

The techniques of this disclosure generally relate to rendering graphics data. A graphics processing unit (GPU) may change render targets during rendering. Changing render targets may be relatively computationally and/or time intensive due to load operations (e.g., loading data to GPU memory) and store operations (e.g., storing data from GPU memory to external memory) associated with render target changes. The techniques of this disclosure include reordering commands associated with render targets based on dependencies between the commands in a way that may reduce load and store operations.

In an example, a method for rendering graphics data includes receiving a plurality of commands associated with a plurality of render targets, wherein the plurality of commands are received in an initial order, determining an execution order for the plurality of commands including reordering one or more of the plurality of commands in a different order than the initial order based on data dependencies between commands, and executing the plurality of commands in the determined execution order.

In another example, a device for rendering graphics data includes a memory configured to store a plurality of commands associated with a plurality of render targets. The device also includes one or more processors configured to receive the plurality of commands associated with the plurality of render targets, wherein the plurality of commands are received in an initial order, determine an execution order for the plurality of commands including reordering one or more of the plurality of commands in a different order than the initial order based on data dependencies between commands, and execute the plurality of commands in the determined execution order.

In another example, a device for rendering graphics data includes means for receiving a plurality of commands associated with a plurality of render targets, wherein the plurality of commands are received in an initial order, means for determining an execution order for the plurality of commands including reordering one or more of the plurality of commands in a different order than the initial order based on data dependencies between commands, and means for executing the plurality of commands in the determined execution order.

In another example, a non-transitory computer-readable medium has instructions stored thereon that, when executed, cause one or more processors to receive a plurality of commands associated a the plurality of render targets, wherein the plurality of commands are received in an initial order, determine an execution order for the plurality of commands including reordering one or more of the plurality of commands in a different order than the initial order based on data dependencies between commands, and execute the plurality of commands in the determined execution order.

The details of one or more examples of the disclosure are set forth in the accompanying drawings and the description below. Other features, objects, and advantages will be apparent from the description and drawings, and from the claims.

DETAILED DESCRIPTION

Figure 1:
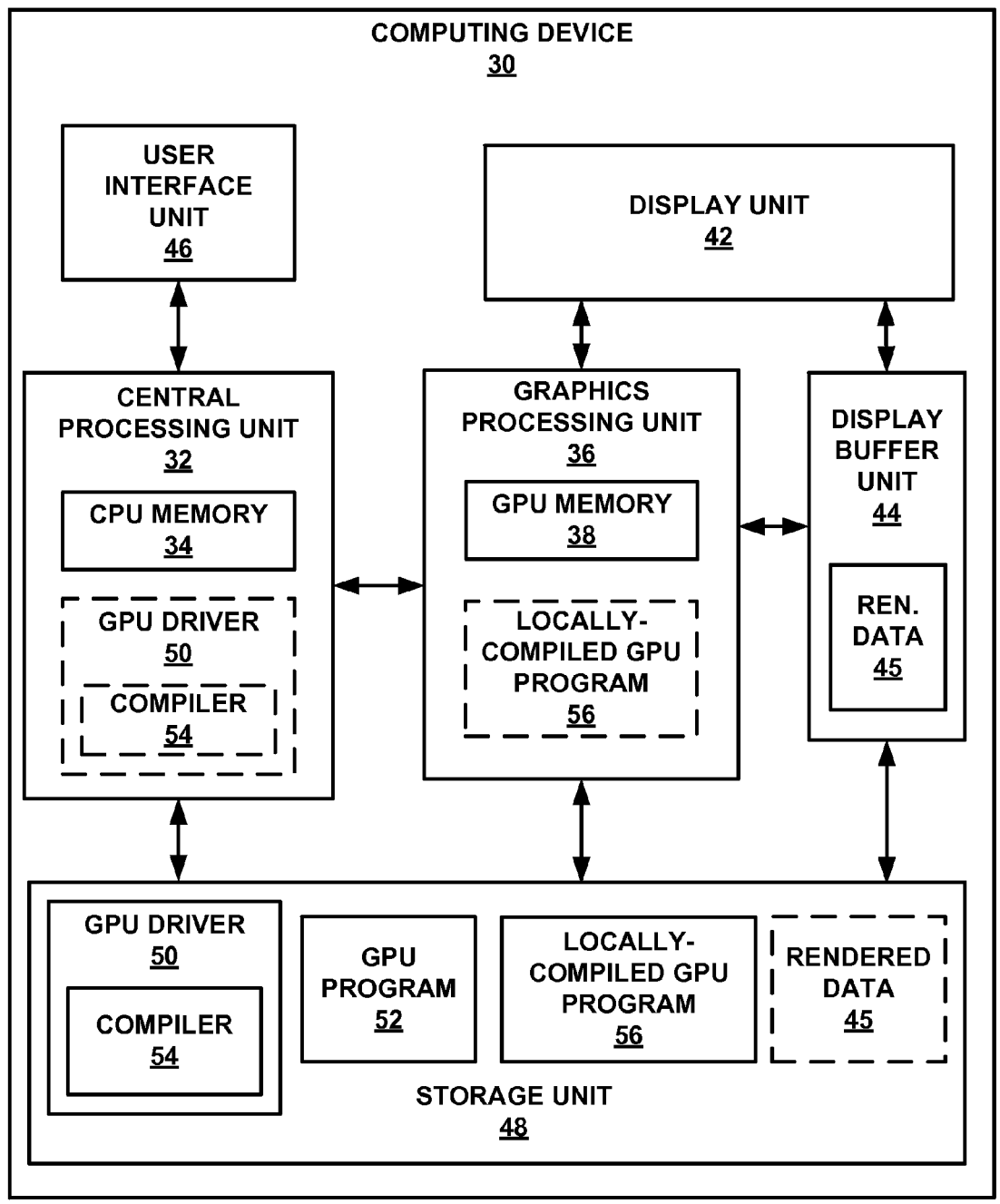
FIG. 1 is a block diagram illustrating a computing device that may be configured to implement aspects of this disclosure.

Traditional graphics processing unit (GPU) architectures may require a relatively large amount of data to be read from and written to system memory when rendering a frame of graphics data (which may be referred to as an image). Mobile architectures (i.e., GPUs on mobile devices) may lack the memory bandwidth capacity required for processing entire frames of data. Accordingly, tile-based architectures have been developed that break an image into multiple tiles. The tiles are sized so that they can be processed using a relatively small amount (e.g., 256 kB) of high bandwidth, on-chip graphics memory (sometimes called graphics memory or GMEM). That is, the size of each tile may depend on the amount of available on-chip graphics memory. The image is then reconstructed after processing each tile individually.

Tile-based rendering may be described with respect to a number of processing passes. For example, when performing tile-based rendering, a GPU may perform a binning pass and a rendering pass. With respect to the binning pass, the GPU may process an entire image and sort rasterized primitives (such as triangles) into tile-sized areas called bins. For example, the GPU processes a command stream for an entire image and assigns the rasterized primitives of the image to bins.

In some examples, the GPU generates one or more visibility streams during the binning pass. A visibility stream indicates the primitives that are visible in the final image and the primitives that are invisible in the final image. For example, a primitive may be invisible if it is obscured by one or more other primitives such that the primitive cannot be seen in the shaded, finished image.

A visibility stream may be generated for an entire image, or may be generated on a per-bin basis (e.g., one visibility stream for each bin). In general, a visibility stream may include a series of 1's and 0's, with each "1" or "0" being associated with a particular primitive. Each "1" indicates that the primitive is visible in the final image. Each "0" indicates that the primitive is invisible in the final image. The visibility stream may control the rendering pass (described below). For example, the visibility stream may be used to skip the rendering of invisible primitives. Accordingly, only the primitives that actually contribute to a bin, i.e., that are visible in the final image, are rendered and shaded, thereby reducing rendering and shading operations.

In other examples, a GPU may use a different process (e.g., other than or in addition to the visibility streams described above) to classify primitives as being located in a particular bin. In another example, a GPU may output a separate list per bin of "indices" that represent only the primitives that are present in a given bin. For example, the GPU may initially include all the primitives (i.e., vertices) in one data structure. The GPU may generate a set of pointers into the structure for each bin that only point to the primitives that are visible in each bin. Thus, only pointers for visible indices are included in a per-bin index list. Such pointers may serve a similar purpose as the visibility streams described above, with the pointers indicating which primitives (and pixels associated with the primitives) are included and visible in a particular bin.

In any case, each rendering pass may include a clear/unresolve stage, a rendering stage, and a resolve stage. During the clear/unresolve stage, the GPU may initialize on-chip memory for a new tile to be rendered. For example, the GPU may initialize the on-chip memory to a certain value (clear), or read values from external memory to the on-chip memory (unresolve). During the rendering stage, the GPU may process the tile and store the processed tile to the on-chip memory. That is, the GPU may implement a graphics processing pipeline to determine pixel values and write the pixel values to the on-chip memory. During the resolve stage, the GPU may transfer the finished pixel values of the tile from the on-chip memory to an external memory, which may be referred to as a frame buffer. After finishing all of the tiles of an image, e.g., storing all of the tiles of the image to the frame buffer, the image is ready to be output (e.g., displayed).

A GPU may render graphics data using one or more render targets. In general, a render target is a buffer in which the GPU draws pixels for an image being rendered. Creating a render target may involve reserving a particular region in memory for drawing. In some instances, an image may be composed of content from a plurality of render targets. For example, the GPU may render content to a number of render targets (e.g., offscreen rendering) and assemble the content to produce a final image (also referred to as a scene).

Render targets may be associated with a number of commands. For example, a render target typically has a width and a height. A render target may also have a surface format, which describes how many bits are allocated to each pixel and how they are divided between red, green, blue, and alpha (or another color format). The contents of a render target may be modified by one or more rendering commands, such as commands associated with a fragment shader. Render targets may also work in conjunction with a depth-stencil buffer.

A program developer may define render targets and associated commands using an application programming interface (API), such as DirectX, as developed by Microsoft, Inc. In some examples, a render target may be analogous to a Frame Buffer Object (FBO), as defined in the Open Graphics Library ("OpenGL") API. While the techniques of this disclosure are generally described with respect to render targets, the techniques described herein may be applied to FBOs or any other similar construct.

In some instances, a GPU may change render targets during rendering. For example, an initial execution order of commands (e.g., as determined by the developer) may cause the GPU to switch between render targets during rendering of an image. Changing render targets may be relatively computationally and/or time intensive. For example, as noted above, each rendering pass has three associate stages including a clear/unresolve stage, a rendering stage, and a resolve stage. When changing render targets, the GPU performs all three stages for all tiles of an image. For example, the GPU processes all tiles and flushes all associated data to memory for a current render target prior to moving to the next render target.

In an example for purposes of illustration, a GPU may receive a command stream having a number of defined rendering targets and associated commands. The GPU may execute a rendering command associated with a first render target. The GPU may then switch to a second render target and execute a rendering command associated with the second render target. The GPU may then switch back to the first render target and execute another rendering command associated with the first rendering target. In this example, the GPU may flush data associated with the first render target to external memory prior to switching to the second render target. In addition, when switching back to the first render target (e.g., after the second render target), the GPU may load data associated with the first render target back to GPU memory to ensure that the appropriate state of the first render target is maintained. This flushing of data and reloading of the data may present a bottleneck in the rendering process.

The techniques of this disclosure include reordering commands associated with render targets based on dependencies between the commands in a way that may reduce the inefficiencies described above. For example, according to aspects of this disclosure, a GPU may determine, prior to rendering data, an execution order for commands associated with render targets to reduce the number of load operations (e.g., loading data from external memory to GPU memory) and store operations (e.g., storing data from GPU memory to external memory) associated with rendering the data. The GPU may reorder the commands for the execution order in a different order than an initial order in which the commands are received and/or defined (e.g., via an API).

In an example for purposes of illustration, a GPU (and/or a GPU driver) may generate per-render target command lists prior to rendering. For example, the GPU may identify commands as being associated with a particular render target and add the commands to the command list for that particular render target. The GPU may continue to add commands to each of the command lists until identifying a data dependency between commands (e.g., identifying a command upon which a previously processed command depends). Upon identifying a data dependency, the GPU may execute the commands that are included in the command lists. The GPU may then restart the process of assembling per-render target command lists.

The techniques of this disclosure may allow the GPU (and/or a GPU driver) to reorder commands to eliminate load and store operations. For example, with respect to the example provided above, prior to rendering, the GPU may generate a first command list for the first render target that includes the first command and the third command, and a second command list for the second render target that includes the second command. During rendering, the GPU may execute both the first command and the third command associated with the first render target prior to switching to the second render target. In this way, the GPU does not need to switch back to the first render target after executing the second command.

As described in greater detail below, the execution order may be determined by a GPU, a GPU driver (e.g., as executed by a central processing unit (CPU)), or a combination thereof. As one example, a GPU driver may generate a command stream as well as per-render target command lists based on the command stream. In another example, a GPU may receive a command stream from the GPU driver and generate the per-render target command lists based on the command stream. In still another example, the GPU driver and the GPU may share the responsibility of determining an execution order for commands.

FIG. 1 is a block diagram illustrating a computing device 30 that may implement the techniques of this disclosure for rendering graphics data. Examples of computing device 30 include, but are not limited to, wireless devices, mobile or cellular telephones, including so-called smartphones, personal digital assistants (PDAs), video gaming consoles that include video displays, mobile video gaming devices, mobile video conferencing units, laptop computers, desktop computers, television set-top boxes, tablet computing devices, e-book readers, fixed or mobile media players, and the like.

In the example of FIG. 1, computing device 30 includes a central processing unit (CPU) 32 having CPU memory 34, a graphics processing unit (GPU) 36 having GPU memory 38 and one or more shading units 40, a display unit 42, a display buffer unit 44 storing rendered data 45 ("ren. data"), a user interface unit 46, and a data storage unit 48. In addition, storage unit 48 may store GPU driver 50 having compiler 54. GPU program 52, and locally-compiled GPU program 56.

Examples of CPU 32 include, but are not limited to, a digital signal processor (DSP), general purpose microprocessor, application specific integrated circuit (ASIC), field programmable logic array (FPGA), or other equivalent integrated or discrete logic circuitry. Although CPU 32 and GPU 36 are illustrated as separate units in the example of FIG. 1, in some examples, CPU 32 and GPU 36 may be integrated into a single unit. CPU 32 may execute one or more applications. Examples of the applications may include web browsers, e-mail applications, spreadsheets, video games, audio and/or video capture, playback or editing applications, or other applications that initiate the generation for image data to be presented via display unit 42.

In the example shown in FIG. 1, CPU 32 includes CPU memory 34. CPU memory 34 may represent on-chip storage or memory used in executing machine or object code. CPU memory 34 may each comprise a hardware memory register capable of storing a fixed number of digital bits. CPU 32 may be able to read values from or write values to local CPU memory 34 more quickly than reading values from or writing values to storage unit 48, which may be accessed, e.g., over a system bus.

GPU 36 represents one or more dedicated processors for performing graphical operations. That is, for example, GPU 36 may be a dedicated hardware unit having fixed function and programmable components for rendering graphics and executing GPU applications. GPU 36 may also include a DSP, a general purpose microprocessor, an ASIC, an FPGA, or other equivalent integrated or discrete logic circuitry.

GPU 36 also includes GPU memory 38, which may represent on-chip storage or memory used in executing machine or object code. GPU memory 38 may each comprise a hardware memory register capable of storing a fixed number of digital bits. GPU 36 may be able to read values from or write values to local GPU memory 38 more quickly than reading values from or writing values to storage unit 48, which may be accessed, e.g., over a system bus.

Display unit 42 represents a unit capable of displaying video data, images, text or any other type of data for consumption by a viewer. Display unit 42 may include a liquid-crystal display (LCD), a light emitting diode (LED) display, an organic LED (OLED), an active-matrix OLED (AMOLED) display, or the like.

Display buffer unit 44 represents a memory or storage device dedicated to storing data for presentation of imagery, such as computer generated graphics, still images, video frames, or the like (rendered data 45) for display unit 42. Display buffer unit 44 may represent a two-dimensional buffer that includes a plurality of storage locations. The number of storage locations within display buffer unit 44 may be substantially similar to the number of pixels to be displayed on display unit 42. For example, if display unit 42 is configured to include 640×480 pixels, display buffer unit 44 may include 640×480 storage locations storing pixel color and intensity information, such as red, green and blue pixel values, or other color values.

Display buffer unit 44 may store the final pixel values for each of the pixels processed by GPU 36. Display unit 42 may retrieve the final pixel values from display buffer unit 44, and display the final image based on the pixel values stored in display buffer unit 44.

User interface unit 46 represents a unit with which a user may interact with or otherwise interface to communicate with other units of computing device 30, such as CPU 32. Examples of user interface unit 46 include, but are not limited to, a trackball, a mouse, a keyboard, and other types of input devices. User interface unit 46 may also be, or include, a touch screen and the touch screen may be incorporated as a part of display unit 42.

Storage unit 48 may comprise one or more computer-readable storage media. Examples of storage unit 48 include, but are not limited to, a random access memory (RAM), a read only memory (ROM), an electrically erasable programmable read-only memory (EEPROM). CD-ROM or other optical disk storage, magnetic disk storage, or other magnetic storage devices, flash memory, or any other medium that can be used to store desired program code in the form of instructions or data structures and that can be accessed by a computer or a processor.

In some example implementations, storage unit 48 may include instructions that cause CPU 32 and/or GPU 36 to perform the functions ascribed to CPU 32 and GPU 36 in this disclosure. Storage unit 48 may, in some examples, be considered as a non-transitory storage medium. The term "non-transitory" may indicate that the storage medium is not embodied in a carrier wave or a propagated signal. However, the term "non-transitory" should not be interpreted to mean that storage unit 48 is non-movable. As one example, storage unit 48 may be removed from computing device 30, and moved to another device. As another example, a storage unit, substantially similar to storage unit 48, may be inserted into computing device 30. In certain examples, a non-transitory storage medium may store data that can, over time, change (e.g., in RAM).

Storage unit 48 stores a GPU driver 50 and compiler 54, GPU program 52, and locally-compiled GPU program 56.

GPU driver 50 represents a computer program or executable code that provides an interface to access GPU 36. CPU 32 executes GPU driver 50 or portions thereof to interface with GPU 36 and, for this reason, GPU driver 50 is shown in the example of FIG. 1 as a dash-lined box labeled "GPU driver 50" within CPU 32. GPU driver 50 is accessible to programs or other executables executed by CPU 32, including GPU program 52.

GPU program 52 may include code written in a high level (HL) programming language, e.g., using an application programming interface (API). Examples of APIs include Open-Computing Language ("OpenCL"), Open Graphics Library ("OpenGL"), and DirectX, as developed by Microsoft, Inc. In general, an API includes a predetermined, standardized set of commands that are executed by associated hardware. API commands allow a user to instruct hardware components of a GPU to execute commands without user knowledge as to the specifics of the hardware components.

GPU program 52 may invoke or otherwise include one or more functions provided by GPU driver 50. CPU 32 generally executes the program in which GPU program 52 is embedded and, upon encountering GPU program 52, passes GPU program 52 to GPU driver 50. CPU 32 executes GPU driver 50 in this context to process GPU program 52. That is, for example, GPU driver 50 may process GPU program 52 by compiling GPU program 52 into object or machine code executable by GPU 36. This object code is shown in the example of FIG. 1 as locally compiled GPU program 56.

In some examples, compiler 54 may operate in real-time or near-real-time to compile GPU program 52 during the execution of the program in which GPU program 52 is embedded. For example, compiler 54 generally represents a unit that reduces HL instructions defined in accordance with a HL programming language to low-level (LL) instructions of a LL programming language. After compilation, these LL instructions are capable of being executed by specific types of processors or other types of hardware, such as FPGAs, ASICs, and the like (including, e.g., CPU 32 and GPU 36).

In the example of FIG. 1, compiler 54 may receive GPU program 52 from CPU 32 when executing HL code that includes GPU program 52. Compiler 54 may compile GPU program 52 to generate locally-compiled GPU program 56 that conforms to a LL programming language. Compiler 54 then outputs locally-compiled GPU program 56 that includes the LL instructions.

GPU 36 generally receives locally-compiled GPU program 56 (as shown by the dashed lined box labeled "locally-compiled GPU program 56" within GPU 36), whereupon, in some instances, GPU 36 renders one or more images and outputs the rendered images to display buffer unit 44. For example, GPU 36 may generate a number of primitives to be displayed at display unit 42. Primitives may include one or more of a line (including curves, splines, etc.), a point, a circle, an ellipse, a polygon (where typically a polygon is defined as a collection of one or more primitives) or any other two-dimensional (2D) primitive. The term "primitive" may also refer to three-dimensional (3D) primitives, such as cubes, cylinders, sphere, cone, pyramid, torus, or the like. Generally, the term "primitive" refers to any basic geometric shape or element capable of being rendered by GPU 36 for display as an image (or frame in the context of video data) via display unit 42.

GPU 36 may transform primitives and other attributes (e.g., that defines a color, texture, lighting, camera configuration, or other aspect) of the primitives into a so-called "world space" by applying one or more model transforms (which may also be specified in the state data). Once transformed, GPU 36 may apply a view transform for the active camera (which again may also be specified in the state data defining the camera) to transform the coordinates of the primitives and lights into the camera or eye space. GPU 36 may also perform vertex shading to render the appearance of the primitives in view of any active lights. GPU 36 may perform vertex shading in one or more of the above model, world or view space (although it is commonly performed in the world space).

Once the primitives are shaded, GPU 36 may perform projections to project the image into a unit cube with extreme points, as one example, at (−1, −1, −1) and (1, 1, 1). This unit cube is commonly referred to as a canonical view volume. After transforming the model from the eye space to the canonical view volume, GPU 36 may perform clipping to remove any primitives that do not at least partially reside within the view volume. In other words, GPU 36 may remove any primitives that are not within the frame of the camera. GPU 36 may then map the coordinates of the primitives from the view volume to the screen space, effectively reducing the 3D coordinates of the primitives to the 2D coordinates of the screen.

Given the transformed and projected vertices defining the primitives with their associated shading data, GPU 36 may then rasterize the primitives. During rasterization, GPU 36 may apply any textures associated with the primitives (where textures may comprise state data). GPU 36 may also perform a Z-buffer algorithm, also referred to as a depth test, during rasterization to determine whether any of the primitives and/or objects are occluded by any other objects. The Z-buffer algorithm sorts primitives according to their depth so that GPU 36 knows the order in which to draw each primitive to the screen. When binning (e.g., for tile-based rendering) shading may not be performed during rasterization. When rendering the primitives, however. GPU 36 may compute and set colors for the pixels of the screen covered by the primitives. GPU 36 then outputs rendered pixels to display buffer unit 44.

Display buffer unit 44 may temporarily store the rendered pixels of the rendered image until the entire image is rendered. Display buffer unit 44 may be considered as an image frame buffer in this context. Display buffer unit 44 may transmit the rendered image to be displayed on display unit 42. While shown and described separately, in some instances, display buffer unit 44 may form a portion of storage unit 48.

In some examples, GPU 36 may implement tile-based rendering to render an image. For example, GPU 36 may implement a tile-based architecture that renders an image by breaking the image into multiple portions, referred to as tiles. The tiles may be sized based on the size of GPU memory 38.

When implementing tile-based rendering, GPU 36 may perform a binning pass and one or more rendering passes. For example, with respect to the binning pass, GPU 36 may process an entire image and sort rasterized primitives into the bins of the initial binning configuration (set by GPU driver 50). GPU 36 may also generate a visibility stream during the binning pass, which may be separated according to bin. For example, each bin may be assigned a corresponding portion of the visibility stream for the image. GPU driver 50 may access the visibility stream and generate command streams for rendering each bin.

With respect to each rendering pass, GPU 36 may perform a clear/unresolve stage, a rendering stage, and a resolve stage. During the clear/unresolve stage, GPU 36 initializes GPU memory 38 for a new tile to be rendered. During the rendering stage, GPU 36 may render the tile and store the rendered tile to GPU memory 38. That is. GPU 36 may perform pixel shading and other operations to determine pixel values for each pixel of the tile and write the pixel values to GPU memory 38. During the resolve stage, GPU 36 may transfer the finished pixel values of the tile from GPU memory 38 to display buffer unit 44 (or storage unit 48). After GPU 36 has rendered all of the tiles associated with a frame in this way, display buffer unit 44 may output the finished image to display unit 42.

In some instances, GPU 36 may directly render data by storing pixel values to display buffer unit 44 (or storage unit 48) following rendering, rather than storing the pixel values to GPU memory 38. With direct rendering, GPU driver 50 does not use a visibility stream to identify and skip primitives that are not visible in the final image. Rather, a command stream includes instructions to render all primitives, regardless of whether the primitives are visible. Accordingly, invisible primitives in storage unit 48 and/or display buffer unit 44 may eventually be written over by pixel values associated with one or more other primitives.

Prior to the rendering described above, GPU driver 50 generates a command stream using GPU program 52. For example, the command stream may contain instructions for rendering images from GPU program 52. GPU driver 50 may add instructions to the command stream, which are executed by GPU 36 in the order in which they appear in the stream. The command steam may define the primitives that make up images from GPU program 52.

As noted above, a command stream may include instructions defining one or more render targets for an image. Creating a render target may reserve a particular region in memory (e.g., such as display buffer unit 44 or storage unit 48) for drawing. In some instances, an image may be composed of content from a plurality of render targets. Each render target may have a plurality of associated commands including rendering commands. Render targets may also work in conjunction with a depth-stencil buffer.

In some instances, GPU 36 may change render targets during rendering. For example, GPU program 52 may include commands in an initial execution order that is maintained by GPU driver 50 when generating the command stream. Commands for different render targets may be interleaved in the command stream, such that GPU 36 switches between render targets when executing locally-compiled GPU program 56.

As noted above, changing render targets may be relatively computationally and/or time intensive due to load and store operations associated with the render targets. For example, prior to executing commands associated with a render target, GPU 36 may load the necessary data from storage unit 48 or display buffer unit 44 to GPU memory 38 for each tile being rendered. In addition, after executing commands associated with a particular render target and prior to switching to a new render target, GPU 36 may flush data associated with the particular render target from GPU memory 38 to storage unit 48 or display buffer unit 44 for each tile being rendered.

According to aspects of this disclosure, GPU 36 (and/or GPU driver 50) may receive commands associated with a plurality of render targets including a first render target having a plurality of first commands and a second render target having a plurality of second commands. GPU 36 (and/or GPU driver 50) may determine an execution order for the commands of the plurality of render targets including the plurality of first commands and the plurality of second commands based on data dependencies between the commands. GPU 36 (and/or GPU driver 50) may then execute the commands of the plurality of render targets in the determined execution order. In some examples, the determined execution order may reduce the number of load operations and store operations associated with rendering the data.

In some instances, GPU 36 (and/or GPU driver 50) may reorder the commands when determining the execution order, such that the commands are in a different order than an initial order of an initial command stream. In an example for purposes of illustration, assume a command stream includes instructions for a first render target A and a second render target B. In addition, assume that the command stream includes an initial execution order of commands that includes first commands associated with render target A, first commands associated with render target B, second commands associated with render target A, and second commands associated with render target B.

In the example above, GPU 36 (and/or GPU driver 50) may determine an execution order for commands of render target A and render target B, which may differ from the initial order dictated by the command stream. For example, GPU 36 (and/or GPU driver 50) may generate per-render target command lists prior to rendering. In such an example, GPU 36 (and/or GPU driver 50) may begin building a render target command list A with the first commands for render target A. GPU 36 (and/or GPU driver 50) may then identify render target B and begin building a render target command list B with the first commands for render target B. GPU 36 (and/or GPU driver 50) may then determine whether the second commands for render target A depend on the commands for render target B. If there is no data dependency, GPU 36 (and/or GPU driver 50) may add the second commands for render target A to the render target command list A. Likewise, if there is no data dependency, GPU 36 (and/or GPU driver 50) may add the second commands for render target B to the render target command list B.

Accordingly, in this example, rather than executing commands for render target A, switching to render target B, executing commands for render target B, switching to render target A, and executing commands for render target A, switching to render target B, and executing commands for render target B, GPU 36 may execute the commands according to a determined execution order. For example, GPU 36 may execute the commands based on the command lists, which allows GPU 36 to execute all commands associated with render target command list A followed by all commands associated with render target command list B. In doing so, GPU 36 makes only a single transition between render target A and render target B, which may reduce the number of load and store operations associated with switching render targets.

It should be understood that computing device 30 is provided as merely an example, and other computing devices 30 performing the techniques of this disclosure may be arranged differently. For example, while display buffer unit 44 is shown and described separately from storage unit 48, in other examples display buffer unit 44 and storage unit 48 may be incorporated into the same component.

Moreover, it should be understood that computing device 30 may include additional modules or units not shown in FIG. 1 for purposes of clarity. For example, computing device 30 may include a transceiver unit for transmitting and receiving data, and may include circuitry to allow wireless or wired communication between computing device 30 and another device or a network. Computing device 30 may also include a speaker and a microphone, neither of which are shown in FIG. 1, to effectuate telephonic communications in examples where computing device 30 is a mobile wireless telephone, such as a smartphone, or a speaker and/or a microphone where computing device 30 is a media player or tablet computer. In some instances, user interface unit 46 and display unit 42 may be external to computing device 30 in examples where computing device 30 is a desktop computer or other device that is equipped to interface with an external user interface or display.

Figure 2:
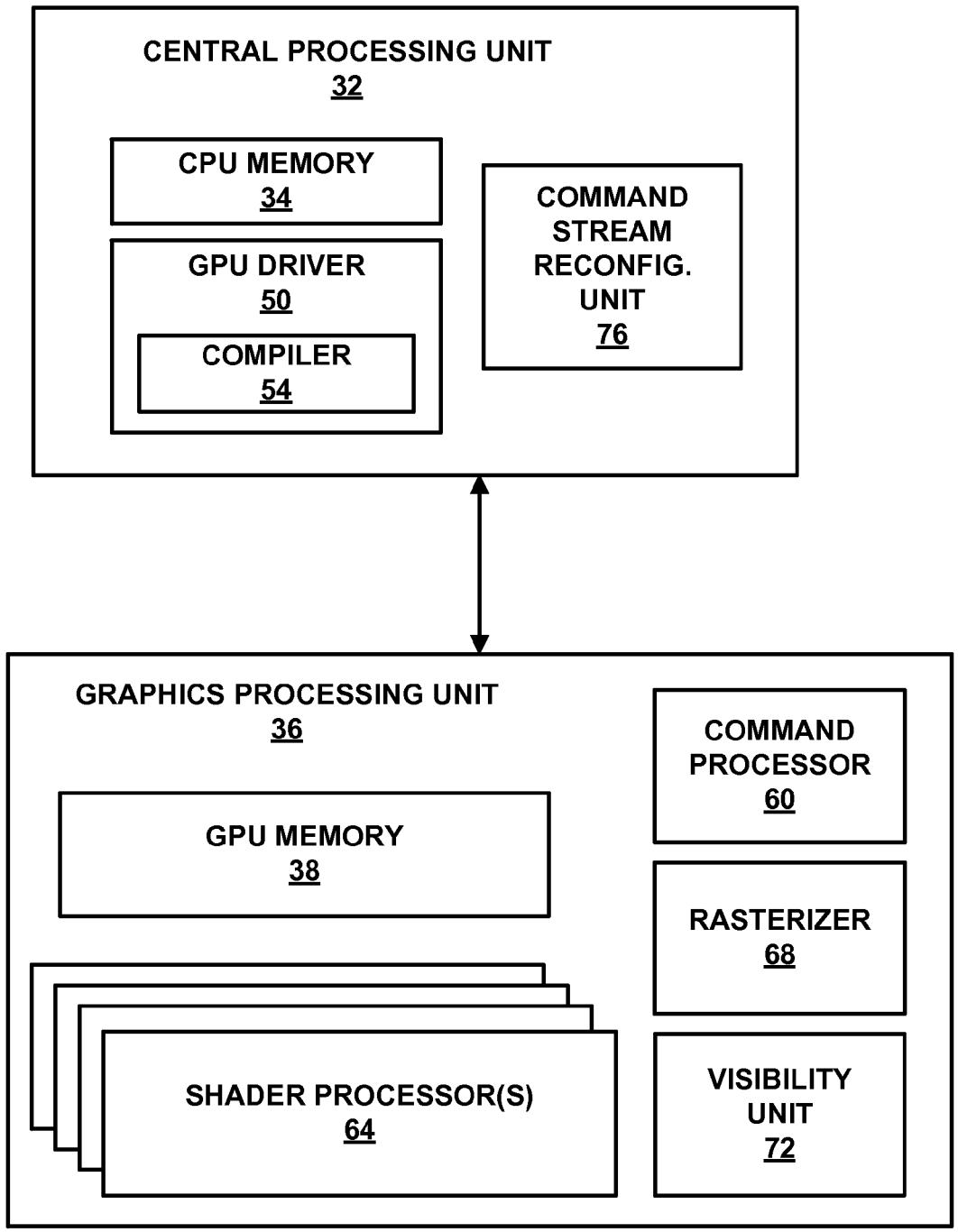
FIG. 2 is a block diagram illustrating the computing device from FIG. 1 in greater detail.

FIG. 2 is a block diagram illustrating portions of computing device 30 in greater detail. In the example of FIG. 2, GPU 36 includes GPU memory 38, command processor 60, one or more processing units 64, a rasterizer 68, and a visibility unit 72. In addition, CPU 32 includes CPU memory 34, GPU driver 50, compiler 54, and command assembly unit 76. It should be understood that certain units of FIG. 2 may be highly integrated, but are illustrated separately for conceptual purposes. Moreover, some units may be described with respect to a single unit for conceptual purposes, but may include one or more functional units.

FIG. 2 is provided as merely one example of a GPU that can utilize the techniques of this disclosure for rendering graphics data. In other examples, the techniques for rendering graphics data may be carried out by a variety of other GPUs having other components. For example, GPU 36 may also include a variety of other components and units related to analyzing and rendering images, such as an input assembly unit, texture units, scheduling units, arithmetic logic units (ALUs), or other fixed function or programmable GPU components.

Components of GPU 36 may access GPU memory 38 with relatively lower latency than accessing an external memory, such as storage unit 48 (FIG. 1). For example, GPU memory 38 may be an on-chip memory that is on-chip with GPU 36 and in relatively close proximity with GPU components, and may be associated with a dedicated memory bus within GPU 36. To access data stored in storage unit 48, in contrast, GPU 36 may have to share a memory bus with other components of computing device 30 (such as CPU 32), which may result in a more limited available bandwidth.

To take advantage of the high bandwidth, low latency GPU memory 38, as described above. GPU 36 may render graphics using a tile-based rendering architecture. GPU 36 may divide an image (which may also be referred to as a scene) into smaller portions (e.g., tiles). GPU memory 38 may store data associated with a tile while GPU 36 renders the tile. After rendering the tile. GPU 36 may resolve, or copy, the rendered pixel data from GPU memory 38 to display buffer unit 44 via a memory bus.

Command processor 60 may be responsible for reading a command stream from GPU driver 50. For example, as described above with respect to FIG. 1, GPU driver 50 may issue instructions for execution by GPU 36, which may be referred to as a command stream. Command processor 60 may read and/or decode the instructions of the command stream. In some examples, command processor 60 may read from a buffer containing the instructions of the command stream. Command processor 60 may also initiate execution of the instructions at GPU 36. For example, command processor 60 may feed instructions to a thread scheduler that schedules the instructions to be executed by processing units 64.

Processing units 64 may include one or more processing units, each of which may be a programmable processing unit or a fixed-function processing unit. In some examples, a programmable shader unit may include a plurality of processing units that are configured to operate in parallel, e.g., an SIMD pipeline. A programmable shader unit may have a program memory that stores shader program instructions and an execution state register, e.g., a program counter register that indicates the current instruction in the program memory being executed or the next instruction to be fetched. The programmable shader units in processing units 64 may include, for example, vertex shader units, pixel shader units, geometry shader units, hull shader units, domain shader units, tessellation control shader units, tessellation evaluation shader units, compute shader units, and/or unified shader units.

Processing units 64 may be responsible for executing instructions. For example, processing units 64 may be responsible for executing one or more shader programs. A shader program, in some examples, may be a compiled version of a program written in a high-level shading language, such as, e.g., an OpenGL Shading Language (GLSL), a High Level Shading Language (HLSL), a C for Graphics (Cg) shading language, etc. In some examples, a shader program may be referred to as a shader kernel. In general, kernel may include program code that defines a task or function to be performed by GPU 36.

Hence, processing units 64 may be programmable shading units responsible for vertex, geometry, and pixel shading operations. For example, one or more of processing units 64 may be responsible for determining vertex positions of primitives (e.g., triangles) that make up a scene to produce a triangle mesh of the scene. In addition, one or more of processing units 64 may be responsible for generating primitives from the triangle mesh, as well as pixel filling and shading operations.

Processing units 64 may be configured identically, or may be individually configured to perform a specific task. For example, one of processing units 64 may be designated as a "binning shader" that is responsible for binning operations, while the remaining processing units 64 may be responsible for performing the vertex, geometry, or pixel shading operations described above.

Rasterizer 68 may include one or more fixed-function processing units that are hard-wired to perform certain functions. Although the fixed function hardware may be configurable, via one or more control signals for example, to perform different functions, the fixed function hardware typically does not include a program memory that is capable of receiving user-compiled programs. In some examples, rasterizer 68 may be configured to perform raster operations, such as, e.g., depth testing, scissors testing, alpha blending, etc.

In addition, rasterizer 68 may receive vertex information and may generate a representation of primitives of a scene. In some examples, rasterizer 68 applies predefined rules to received vertex information to determine which primitives are visible in the final scene. Rasterizer 68 may cull, or remove, any invisible primitives of the scene. For example, rasterizer 68 may perform z-buffering (which may also be referred to as depth testing) to identify primitives that are covered by other primitives, and therefore not visible in the final scene.

Visibility unit 72 may include any combination of fixed function hardware components and/or programmable processing units. Visibility unit 72 may receive the rasterized data from rasterizer 68 and generate one or more visibility streams. To generate the visibility stream, visibility unit 72 may distribute each of the visible primitives, as determined by rasterizer 68, to bins. Each bin may represent a tile of the finished scene.

In some examples, visibility unit 72 may generate a separate visibility stream for each of the bins. For example, visibility unit 72 may generate a visibility stream for a particular bin by setting flags to indicate which pixels of primitives of the particular bin are visible and which pixels of primitives of the particular bin are invisible. According to some aspects, visibility unit 72 may set a flag value of "1" to indicate that a primitive is visible in the final scene and a flag value of "0" to indicate that a primitive is not visible in the final scene. In some examples, visibility unit 72 may operate according to a course rasterization of an image. That is, rather than indicating the visibility status of each pixel, visibility unit 72 may determine visibility information on a coarser scale (e.g., for blocks of four pixels).

In other examples, visibility unit 72 may use a different process to classify primitives as being located in a particular bin. In another example, visibility unit 72 may output a separate list per bin of "indices" that represent only the primitives that are present in a given bin. For example, visibility unit 72 may initially include all the primitives (i.e. vertices) in one data structure. Visibility unit 72 may generate a set of pointers into the structure for each bin that only point to the primitives that are visible in each bin. Thus, only pointers for visible indices are included in a per-bin index list.

According to aspects of this disclosure, command assembly unit 76 may be responsible for determining an execution order for commands included in a command stream. For example, command assembly unit 76 may be configured to receive a command stream having a plurality of commands associated with one or more render targets. The command stream may include the plurality of commands in an initial execution order.

Command assembly unit 76 may determine an execution order for the commands of the command stream based on the presence or absence of data dependencies between the commands. In some examples, command assembly unit 76 may determine the execution order using a number of render target command lists, each of which includes a list of commands associated with the respective render target. Command assembly unit 76 may add commands to command lists until identifying a data dependency and/or a change in rendering mode (e.g., direct rendering mode, binned rendering, or the like).

According to aspects of this disclosure, a render target command list may be referred to as a bucket. For example, command assembly unit 76 may generate a bucket per-rendering target. A bucket may be described as a chain of rendering command references for a single render target (e.g., also referred to as an FBO configuration) as a result of rendering to that configuration. The chain may include a mix of commands including preamble commands for preparing GPU 36 for rendering, actual rendering commands (e.g., draws), and restore state commands (e.g., for restoring GPU 36 to a particular state for drawing). In general, a bucket contains all the rendering commands that were issued for a particular rendering target. A bucket may also be referred to herein as a command list.

Command assembly unit 76 may generate more than one bucket prior to rendering. GPU 36 may then sequentially render the commands associated with each bucket during. In general, GPU 36 may execute rendering commands of Bucket N prior to rendering commands of Bucket N+1.

In some examples, as described in greater detail below, GPU 36 and command assembly unit 76 may control rendering using a first command buffer and a second command buffer. For example, command assembly unit 76 may determine commands for a first buffer that reference the second buffer. The first buffer typically does not include rendering commands such as draw commands or copy commands.

The second command buffer may include references to rendering commands (e.g., including preamble commands, draw commands, copy commands, restore state commands, or the like). In this example, command assembly unit 76 may generate an execution order by assembling (and reordering) references to rendering commands in the second command buffer. Upon rendering, GPU 36 may execute the first command buffer, which includes references to commands of the second command buffer in the appropriate order.

While shown separately from GPU driver 50 for purposes of explanation, it should be understood that command assembly unit 76 may be integrated with GPU driver 50, such that GPU driver 50 carries out the techniques ascribed in this disclosure to command assembly unit 76. However, while the techniques above are described as being performed by command assembly unit 76 of GPU driver 50, it should be understood that command assembly unit 76 may be integrated with GPU 36, such that GPU 36 is responsible for determining an execution order for rendering commands. In this example, GPU 36 may receive a command stream from GPU driver 50 and determine an execution order prior to rendering the commands of the command stream.

FIGS. 3A-3D are flow diagrams illustrating an example command assembly process, consistent with the techniques of this disclosure. For example, the left-most column of FIGS. 3A-3D illustrates a number of rendering commands associated with a first render target (render target A) and a second render target (render target B). The rendering commands of FIGS. 3A-3D are labeled one through six (as indicated by the circled numbers). The columns to the right in FIGS. 3A-3D illustrate assembling commands associated with render target A and render target B in an execution order. That is, FIGS. 3A-3D illustrate generating per-render target buckets, with each bucket containing a list of references to commands.

For example, as noted above, in some instances, a GPU (such as GPU 36) or a GPU driver (such as GPU driver 50) may order commands for execution using a first buffer, which may be referred to as IB1, and a second buffer, which may be referred to as IB2. IB1 may be referred to as indirect buffer 1, while IB2 may be referred to as indirect buffer 2. IB1 and IB2 may be hierarchical. For example, commands in an IB1 may call an entire command stream in an IB2. Hence, the IB1 typically includes references to the IB2 and may be used during rendering. The IB2 may include references to rendering commands (e.g., including preamble commands, draw commands, copy commands, restore state commands, or the like). In this way, GPU 36 may build a list of commands in the IB2 and flush the determined list of commands to the IB1 for execution.

Accordingly, in the example of FIGS. 3A-3D, a bucket may be a chain of IB2 references for a single render target (e.g., an FBO configuration) as a result of rendering to that configuration. The chain may include a mix of commands from a preamble IB2, a rendering IB2, and a restore state IB2 (e.g., a subset of a preamble IB2), as described in greater detail below. Accordingly, each bucket contains all of the rendering commands that were issued for a particular render target. As noted above, there may be multiple buckets waiting to be dispatched to the IB1. In general, GPU 36 may execute rendering commands in bucket N prior to rendering commands of bucket N+1.

As GPU 36 renders to a particular render target, GPU 36 may accumulate in a rendering IB2. When switching from one render target to another (or there is a flush of commands to the IB1), GPU 36 may save the accumulated rendering to the existing bucket for the current render target, or may generate a new bucket entry. Each render target may map to a render bucket ID, which identifies each of the buckets.

According to aspects of this disclosure and as described in greater detail below, GPU 36 may reorder commands for render target A and render target B from an initial order based on data dependency between commands of render target A and render target B. For example, assume an initial order of operations includes render to render target A, render to render target B, render to render target A, and render to render target B. According to aspects of this disclosure, when there is no data dependency between render target A and render target B, GPU 36 switches from render target B back to render target A. GPU 36 may continue accumulating commands for render target A in the same bucket in which the previous commands for render target A were accumulated. Likewise, GPU 36 may use a single bucket to accumulate commands for render target B. GPU 36 may then flush the buckets, with the commands for render target B following the commands for render target A.

According to some aspects of this disclosure, GPU 36 may determine data dependency at least partially based on timestamps associated with the rendering commands. For example, GPU driver 50 may issue timestamps to each rendering command of a command stream based on an order in which the rendering commands are intended to be executed. Accordingly, GPU 36 may determine a data dependency for a current command by identifying whether any commands associated with the current command have timestamps earlier than a timestamp of the current command. In some examples, GPU 36 may additionally or alternatively determine a data dependency based on the manner in which GPU 36 accesses command buffers. For example, GPU 36 may designate a command buffer as a source buffer (from which data is read) or a destination buffer (to which data is written). If GPU 36 has referenced a particular command buffer as a source when executing instructions of a previous command buffer, GPU 36 may only write to the particular command buffer in a subsequent command buffer (e.g., GPU 36 may not reorder the write prior to the read). Likewise, if GPU 36 has referenced the particular command buffer, GPU 36 may only read from the particular buffer in subsequent command buffers (e.g., GPU 36 may not reorder the read prior to the write).

The reordering described above may help to reduce the number of load and store operations that are associated with render target A and render target B, because GPU 36 does not have to make more than a single transition between render target A and render target B, as noted above. When GPU 36 finishes a batch of rendering (e.g., there are no additional commands to be added to a bucket), GPU 36 may determine a rendering mode for the bucket. Example rendering modes include a direct rendering mode, a binning rendering mode using software, a binning rendering mode using hardware of GPU 36, or other rendering modes. GPU 36 may use the determined rendering mode when flushing the buckets into the IB1. In some instances, the rendering mode may be considered to be part of the bucket, is determined when the bucket entry is created, and may not change after designation.

Figure 3A:
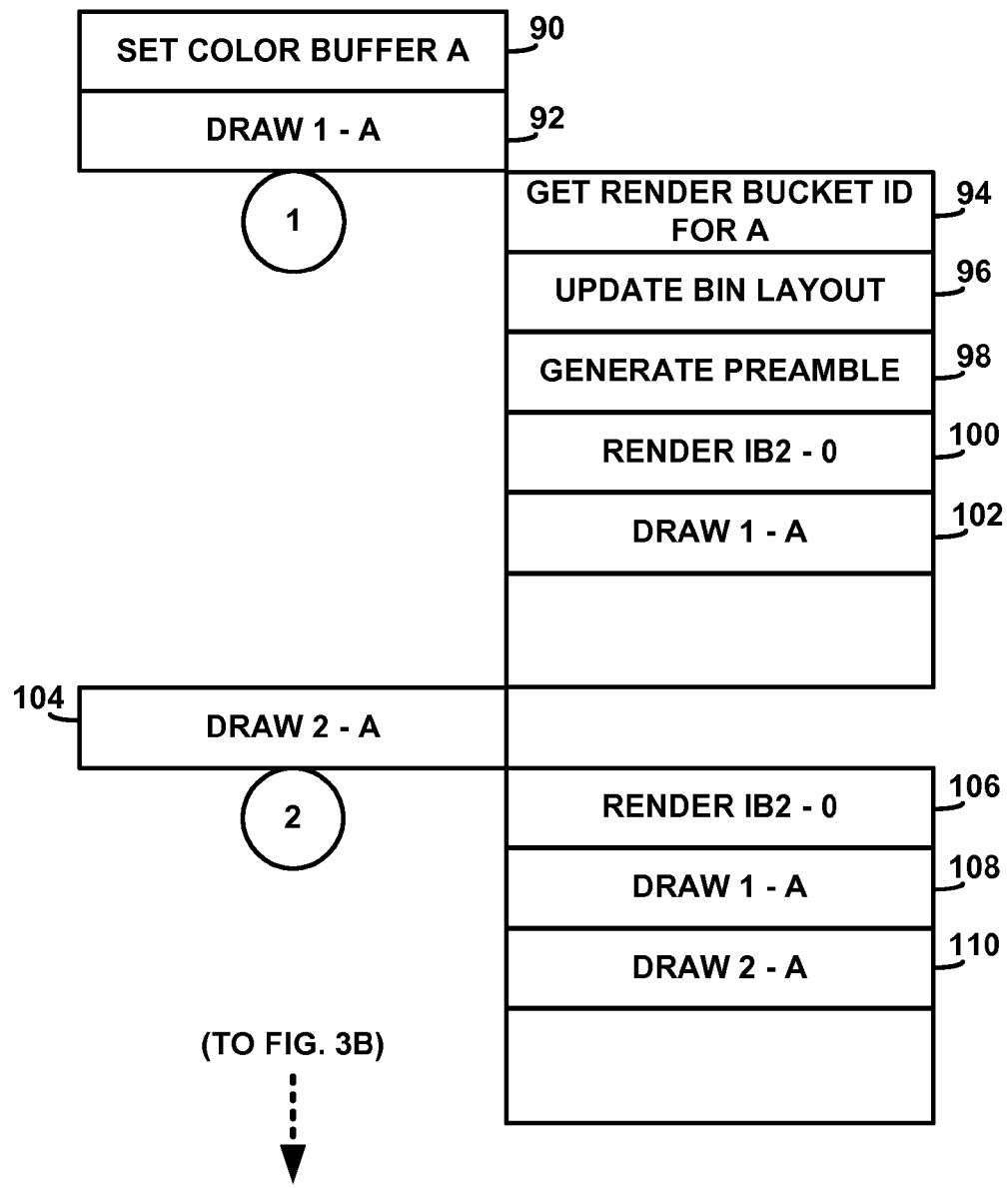
FIGS. 3A-3D are flow diagrams illustrating an example command reordering process, consistent with the techniques of this disclosure.

As an example of the bucketing process, with respect to step 1 of FIG. 3A, GPU 36 may receive an instruction setting a color buffer for render target A (set color buffer A) (90), followed by a first draw command for render target A (draw 1-A) (92). In response, GPU 36 may begin building a bucket for render target A by generating a bucket ID for render target A (get render bucket ID for A) (94) and updating a bin layout of the image being rendered (update bin layout) (96). GPU 36 may then add a preamble command to the bucket (generate preamble) (98), which may instruct GPU 36 to enter a known state (e.g., including the status of GPU memory 38) for drawing. GPU 36 may then add a render IB2 command (render IB2-0) (100) and a draw command (draw 1-A) (102).

At step 2, GPU 36 may receive a second draw command for render target A (draw 2-A) (104). GPU 36 may add the second draw command to the IB2 that was previously generated during step 1. That is, GPU 36 adds the second command (draw 2-A) to the end of the IB2 for render target A (render IB2-0 (106), draw 1-A (108), draw 2-A (110)).

Figure 3B:
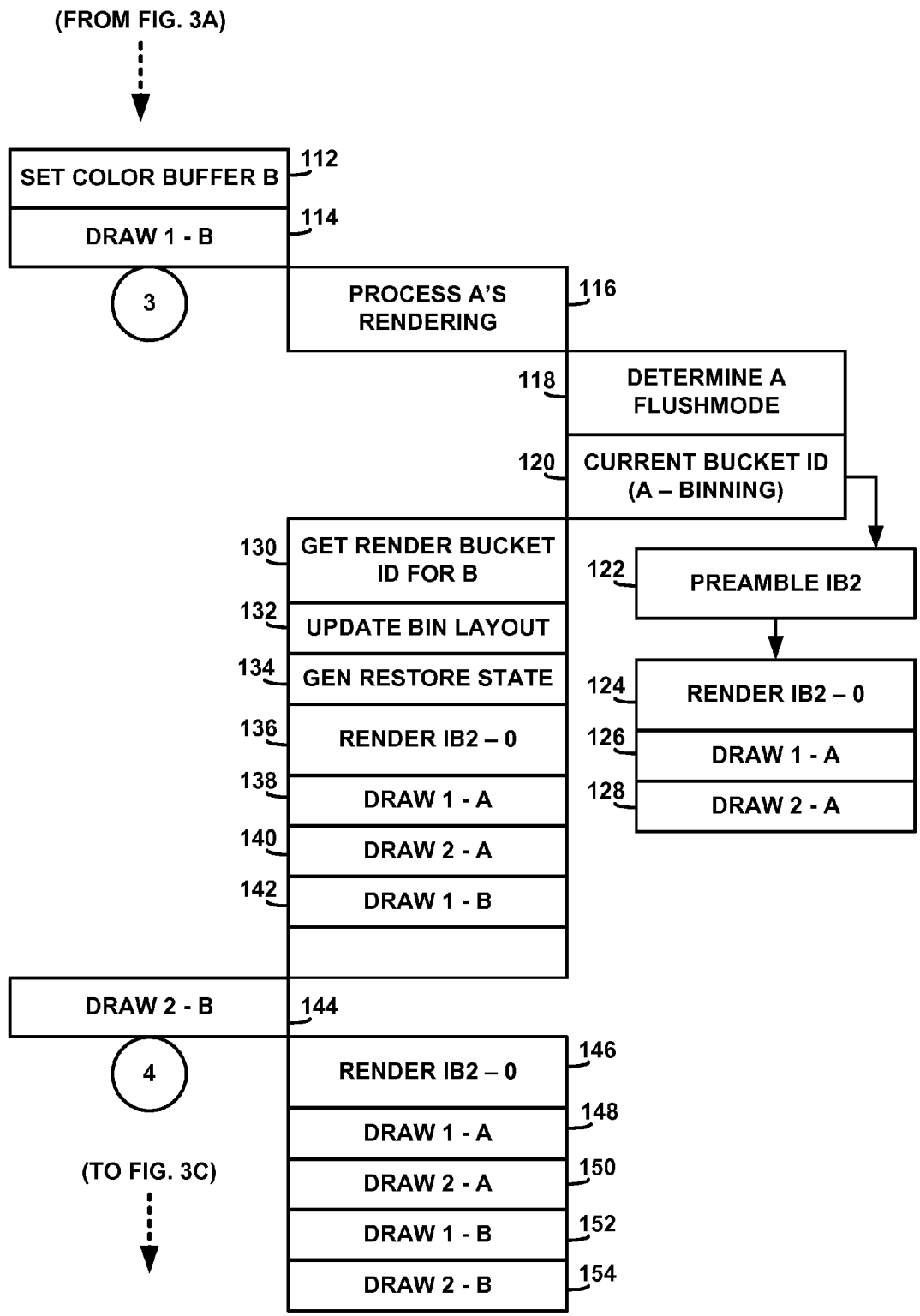

FIG. 3B continues the process at step 3, in which GPU 36 receives a new render target, identified as render target B. For example, GPU 36 receives an instruction setting a color buffer for render target B (set color buffer B) (112), followed by a first draw command for render target B (draw 1-B) (114). In response, GPU 36 processes A's rendering (process A's rendering) (116) and determines a flushmode (determine A flushmode) (118), which may also be referred to as a rendering mode, for the bucket for render target A. In the example shown in FIG. 3B, GPU 36 determines a binning mode for render target A (current bucket ID (A-binning)) (120), which is associated with a preamble command (preamble IB2) (122) and the commands currently in the bucket for render target A (render IB2-0 (124), draw 1-A (126), draw 2-A (128)).

In addition, GPU 36 may begin building a new bucket for render target B by generating a bucket ID for render target B (get render bucket ID for B) (130) and updating a bin layout of the image being rendered (update bin layout) (132). GPU 36 may also include a command for generating a restore state (134) to return GPU 36 in the proper state for rendering. For example, when reordering commands, GPU 36 is returned to an expected state (e.g., having the appropriate data stored to GPU memory 38) prior to executing a new rendering command. GPU 36 may then add a render IB2 command (render IB2-0) (136), which now includes the first draw command for render target A (draw 1-A) (138), the second draw command for render target A (draw 2-A) (140), and the first draw command for render target B (draw 1-B) (142).

FIG. 3B continues the process at step 4, in which GPU 36 receives a second first draw command for render target B (draw 2-B) (144). GPU 36 may add the second draw command to the IB2 that was previously generated during step 3. That is, GPU 36 adds the second command for render target B (draw 2-B) to the end of the IB2, such that the IB2 now includes the first draw command for render target A (draw 1-A) (148), the second draw command for render target A (draw 2-A) (150), the first draw command for render target B (draw 1-B) (152), and the second draw command for render target B (draw 2-B) (154).

Figure 3C:
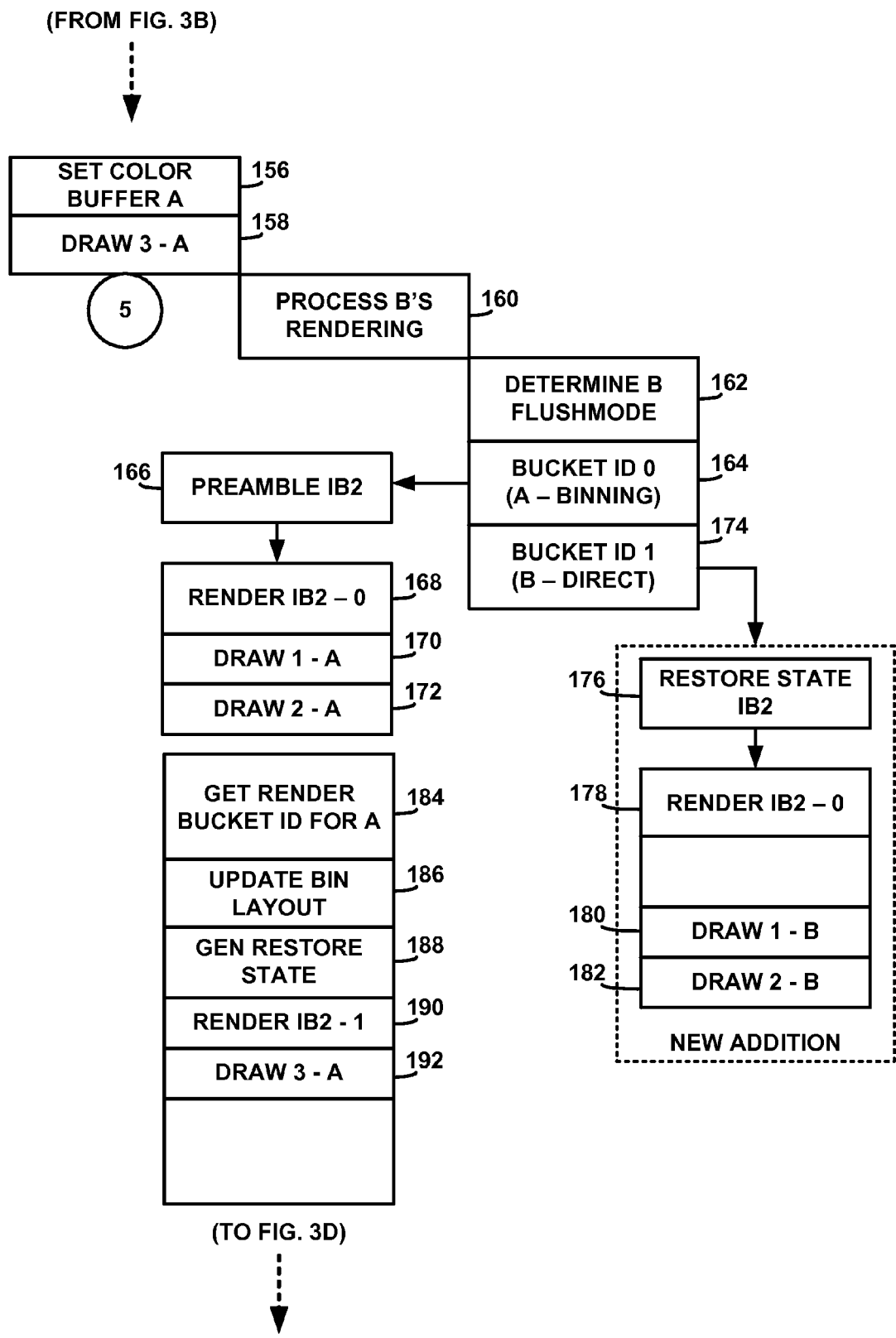

FIG. 3C continues the process at step 5, in which GPU 36 switches back to render target A (set color buffer A) (156) for a third draw command for render target A (draw 3-A) (158). When switching render targets, GPU 36 processes any work that has been batched for the preceding render target. Accordingly, GPU 36 processes B's rendering (process B's rendering) (160) and determines a flushmode (determine B flushmode) (162) for the bucket for render target B. As described with respect to FIG. 3B, for bucket ID 0 (associated with render target A) (164), GPU 36 includes a preamble command for render target A (preamble IB2) (166) and the commands currently in the bucket for render target A, including render IB2-0 (168), draw 1-A (170), draw 2-A (172). As a new addition for bucket ID 1 (associated with render target B) (174) GPU 36 includes a restore state command (restore state IB2) (176) and the commands currently in the bucket for render target B, including render IB2-0 (178), draw 1-B (180), and draw 2-B (182).

In addition, in the example of FIG. 3C, GPU 36 includes the third draw command for render target A in a separate IB2 than the first two draw commands for render target A. For example, GPU 36 gets the previously generated bucket ID for render target A (get render bucket ID for A) (184) and updates a bin layout of the image being rendered (update bin layout) (186). GPU 36 may also include a command for generating a restore state to return GPU 36 in the proper state for rendering (gen restore state) (188). GPU 36 may then add a render IB2 command (render IB2-1) (190), which now includes the third draw command for render target A (draw 3-A) (192). While FIG. 3C illustrates the third draw command for render target A as being included in a separate IB2 (IB2-1), in other examples, the third draw command for render target A may be added to the IB2 with the first two draw commands for render target A (IB2-0).

Figure 3D:
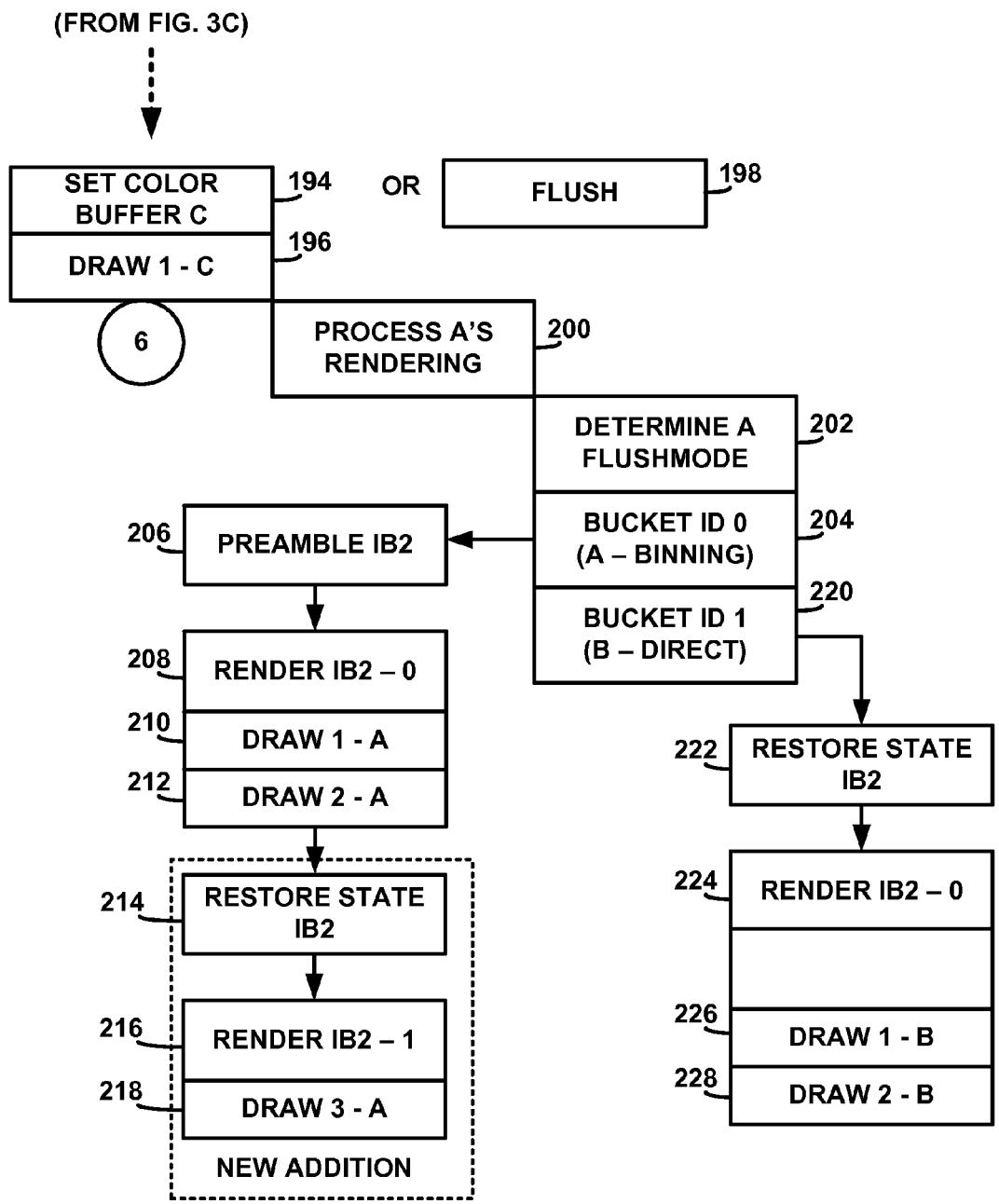

FIG. 3D continues the process at step 6, in which GPU 36 receives a new render target, identified as render target C. For example, GPU 36 receives an instruction setting a color buffer for render target C (set color buffer C) (194), followed by a first draw command for render target C (draw 1-C) (196). Assume for purposes of illustration that render target C has a data dependency with either render target A or render target B. In this example, GPU 36 may flush the rendering commands to a command buffer (e.g., an IB1 buffer) for rendering.

In another example, an application may flush the IB2s (198), e.g., to present the data to be rendered at display unit 42. That is, GPU 36 may force an IB2 flush regardless of the commands that follow when the data is ready to be output. In either case, as noted above, prior to switching render targets (or flushing) GPU 36 processes any work that has been batched for the preceding render targets.

Accordingly, GPU 36 may process render target A's rendering commands (200). For example, GPU 36 determines a flushmode (determine A flushmode) (202) for the bucket for render target A. As described above, for bucket ID 0 (associated with render target A) (204), GPU 36 includes a preamble command for render target A (preamble IB2) (206) and the commands currently in the bucket for render target A, including render IB2-0 (208), draw 1-A (210), and draw 2-A (212). As a new addition for bucket ID 0 (associated with render target A), GPU 36 also includes a restore state command (restore state IB2) (214) and the commands currently in the bucket for render target A of the second IB2 (render IB2-1) (216) and draw 3-A (218). In addition, for bucket ID 1 (associated with render target B) (220), GPU 36 includes a restore state command (restore state IB2) (222) and the commands currently in the bucket for render target B, including render IB2-0 (224), draw 1-B (226), and draw 2-B (228).

In this way, GPU 36 may determine an execution order for rendering commands in a different order than an initial order of the commands. For example, GPU 36 may build a command buffer for rendering using the ordered IB2 references described with respect to FIGS. 3A-3D.

Figure 4:
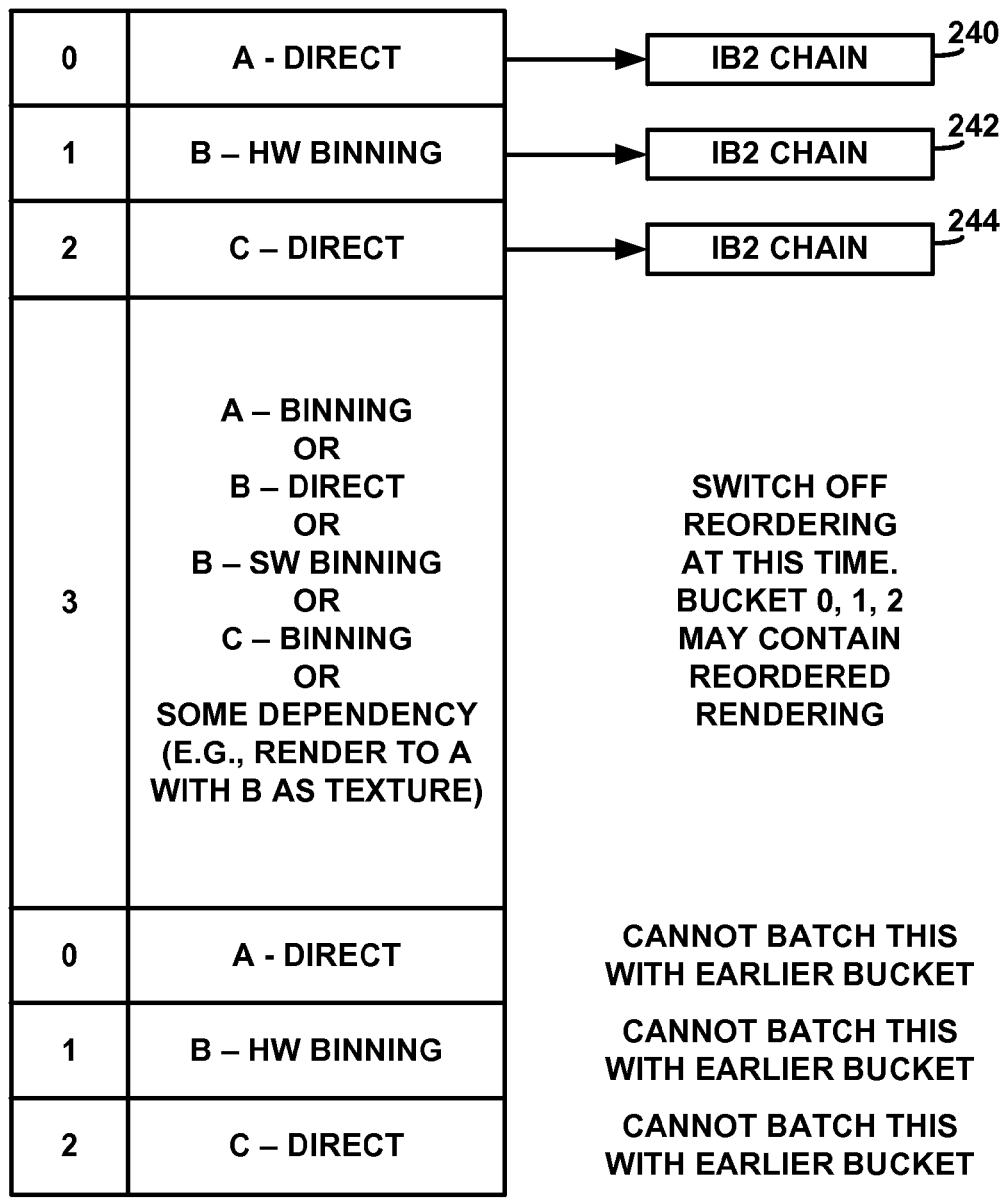
FIG. 4 is a flow diagram illustrating another example command reordering process, consistent with the techniques of this disclosure.

FIG. 4 is a flow diagram illustrating another example command reordering process, consistent with the techniques of this disclosure. For example, according to aspects of this disclosure, a GPU (such as GPU 36) may operate in two reordering modes including a "reordering on" mode and a "reordering off" mode. GPU 36 may default to operating in the reordering on mode unless the reordering function is explicitly disabled.

When reordering is turned on, GPU 36 each render target maps to a bucket and commands for rendering to the render target are accumulated in the bucket. Accumulation may continue in a previously filled bucket as long as the flushmode (e.g., rendering mode, such as direct rendering or binning) of the accumulated rendering commands match the incoming rendering commands. In the example shown in FIG. 4, render target A is associated with a direct rendering mode and a first IB2 chain of rendering commands 240. Render target B is associated with a hardware binning rendering mode and a second IB2 chain of rendering commands 242. Render target C is associated with a direct rendering mode and a third IB2 chain of rendering commands 244.

Upon encountering a rendering command that is associated with a different flushmode (e.g., rendering mode) than the commands already associated with a bucket (e.g., an IB2 chain, such as chains 240-244), GPU 36 may turn reordering off (switch to reordering off mode). In the example of FIG. 4, example commands that do not have the same flushmode as an already defined bucket include a rendering command for render target A having a binning mode, a rendering command for render target B having a direct mode, a rendering command for render target B having a software binning mode, or a rendering command for render target C having a binning mode. As noted above, GPU 36 may also turn reordering off when encountering a data dependency between rendering commands of established buckets. An example of a data dependency may be rendering to render target A with data of render target B being used as a texture for render target A.

After reordering has been turned off, GPU 36 may generate new buckets for render targets. That is, GPU 36 may not combine the commands of render targets with commands of previously defined buckets for the render targets, even if a bucket has already been established for a particular render target. In the example shown in FIG. 4, GPU 36 may generate new buckets for render target A (direct rendering mode), render target B (hardware binning rendering mode), and render target C (direct rendering mode).

When GPU 36 flushes rendering commands to hardware for rendering, GPU 36 processes each of the buckets according to the rendering mode associated with the bucket (e.g., either direct render or binning), inserts the commands of the buckets into an IB1, and submits the IB1 for rendering. Each bucket may entry may be conceptualized as a shorthand version of the work that is added to the IB1.

While the example of FIG. 4 is described with respect to reordering either being on or off, in other examples, GPU 36 may use a further refined approach in which reordering may be switched on or off on a per-bucket basis. Such a refinement may be achieved at the expense of additional dependency tracking.

Figure 5A:
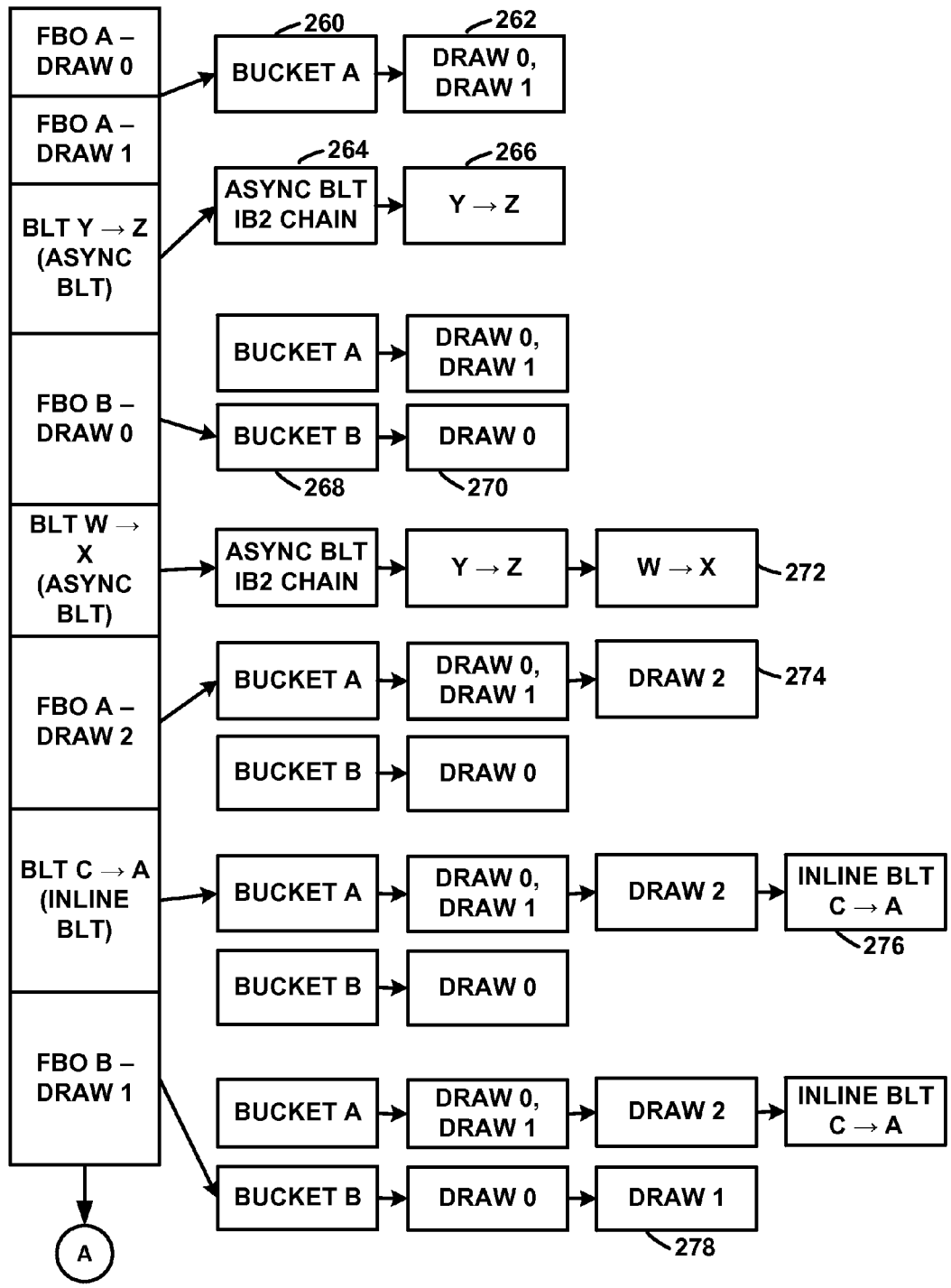
FIGS. 5A-5B are flow diagrams illustrating another example command reordering process, consistent with the techniques of this disclosure.
Figure 5B:
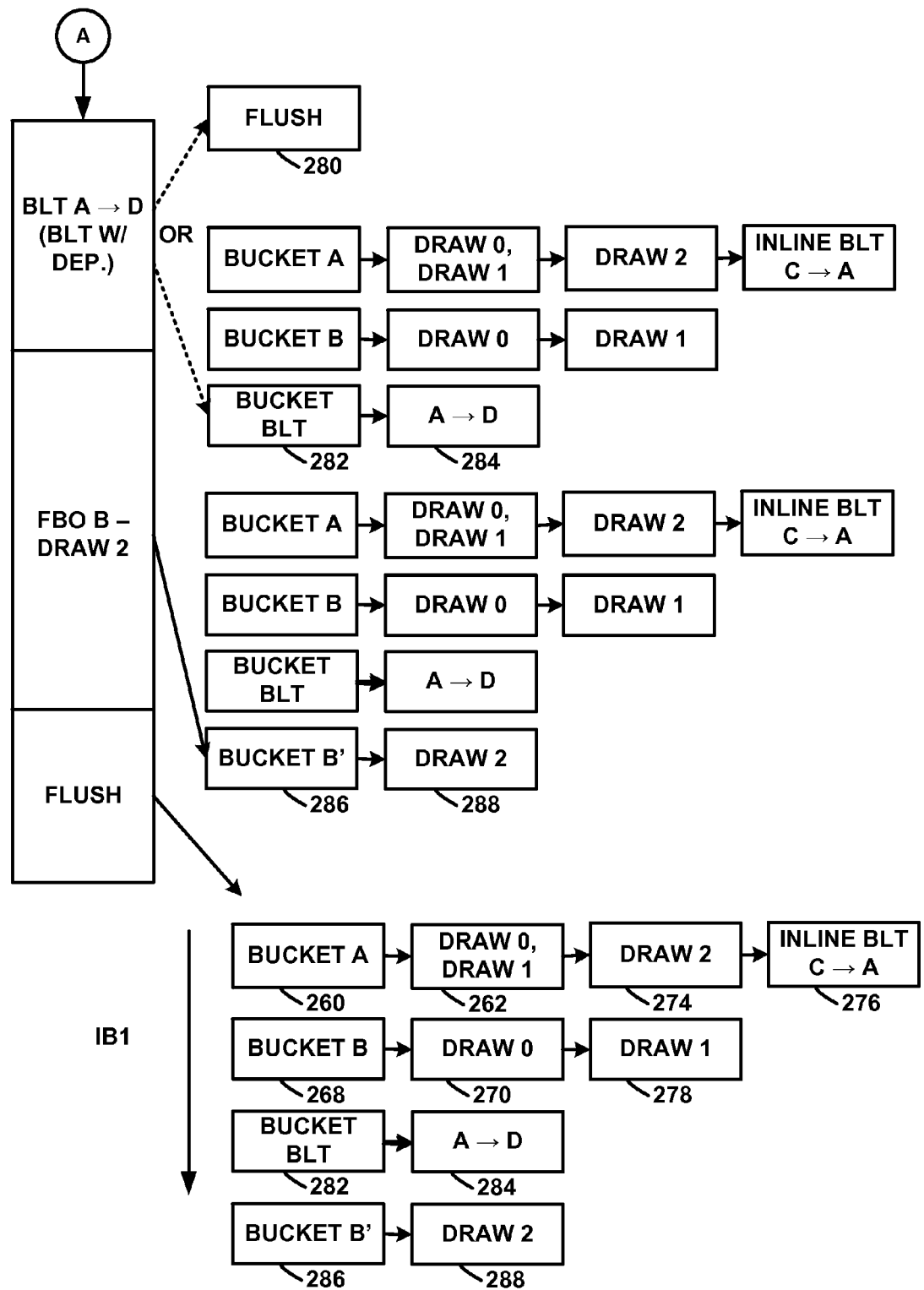

FIGS. 5A-5B are flow diagrams illustrating another example command reordering process, consistent with the techniques of this disclosure. In some instances, the example commands shown in FIGS. 5A and 5B may be reordering in an execution order in a similar manner to that described with respect to FIGS. 3A-3D above. However, the example of FIGS. 5A-5B includes a number of block transfer (BLT) commands.

In general, executing a BLT command copies data from a source location to a destination location. The data being copied from the source location may be combined with the data of the destination location. A BLT command may or may not be associated with a current render target. BLT commands may be executed inline or asynchronously. For example, an inline BLT may be executed along with rendering commands, and the destination of the BLT may be the same as the render target of the batch of rendering commands being executed. An asynchronous BLT does not have a dependency on the render target (or source textures). In some examples, an asynchronous BLT may be reordered into the first batch of commands being executed.

According to aspects of this disclosure, a BLT command may be handled in the same manner as other rendering commands. For example, upon encountering a BLT command, a GPU (such as GPU 36) may determine whether the BLT command has a data dependency with other render targets. If a BLT command depends on the results of one or more previous commands, GPU 36 may handle the BLT in the same manner as other rendering commands, as described above. For example, GPU 36 may flush the current buckets or create a new bucket (without flushing) and switch command reordering off.

With respect to the example shown in FIG. 5A, GPU 36 may receive a first rendering command for render target A (FBO A-draw 0) and a second rendering command for render target A (FBO A-draw 1). In response to receiving the commands, GPU 36 may generate a new bucket (bucket A) (260) and add the first and second rendering commands to the bucket (draw 0, draw 1) (262).

GPU 36 then receives a BLT command (an async BLT) copying the contents of Y (an arbitrary location for purposes of example) to Z (another arbitrary location). In response to receiving the BLT command. GPU 36 may generate a new BLT bucket (async BLT IB2 chain) (264) and add the Y to Z BLT (266). In some examples, GPU 36 may execute async BLT commands separately from other rendering commands. As noted above, an async BLT does not have a dependency on the render target, and GPU 36 may reorder the async BLT into the first batch of commands being executed. While GPU 36 may generally execute the async BLTs in a first batch of commands being executed, in some examples, GPU 36 may create a new bucket and process the new bucket as if the new bucket is associated with a new draw to a new render target.

GPU 36 then receives a first rendering command for render target B (FBO B-draw 0). In response to receiving the command. GPU 36 may generate a new bucket (bucket B) (268) and add the first rendering command to the bucket (draw 0) (270).

GPU 36 then receives an additional async BLT command copying the contents of W (an arbitrary location) to X (another arbitrary location). In response to receiving the BLT command. GPU 36 may add the BLT command to the async BLT IB2 chain (272).

GPU 36 then receives a third rendering command for render target A (FBO A-draw 2). In response to receiving the command. GPU 36 may add the rendering command to the previously generated bucket A for render target A (274). In some instances, GPU 36 may determine whether the third rendering command (draw 2) has any associated data dependencies before adding the command to bucket A.

GPU 36 then receives an inline BLT command copying the contents of C (an arbitrary location) to render target A. In response to receiving the BLT command, GPU 36 may add the BLT command to the previously generated bucket A for render target A (276). Again, GPU 36 may determine whether the BLT command (C to A) has any associated data dependencies before adding the command to bucket A.

GPU 36 then receives a second rendering command for render target B (FBO B-draw 1). In response to receiving the command, GPU 36 may add the second rendering command to the previously generated bucket B for render target B (278).

GPU 36 then receives a BLT from render target A to location D, which includes a data dependency. At this point, GPU 36 may flush the generated command lists due to the data dependency (280). In another example, GPU 36 may turn command reordering off, and may generate a new BLT bucket (bucket BLT) (282) and add the BLT command to the new BLT bucket (284).

With reordering turned off, GPU 36 may not add commands to previously generated buckets, even if incoming commands are associated with a render target that has a previously established bucket. Accordingly, when GPU 36 receives a third rendering command for render target B (FBO-draw 2), GPU 36 may generate a new bucket (bucket B') and add the third rendering command to the new bucket (288). In other examples, reordering may not be turned off. For example, turning reordering off may help to reduce the number of dependencies that are tracked. However, without reordering turned off, GPU 36 may reorder the third rendering command for render target B (FBO-draw 2), provided the third rendering command for render target B (FBO-draw 2) does not have a dependency on render target A or location D. In this example, GPU 36 may reorder the third rendering command for render target B (FBO-draw 2) to follow the second rendering command for render target B (draw 1).

GPU 36 may then receive a command to flush the rendered contents to external memory (flush). In response to receiving the flush command, GPU 36 may build a command buffer (IB1) using the reordered rendering commands. That is, GPU 36 may add the determined command lists for bucket A, bucket B, bucket BLT, and bucket B' in order to the command buffer. In this way, GPU 36 defers the building of a command buffer until after receiving and flexibly reordering the rendering commands of the command buffer.

Figure 6:
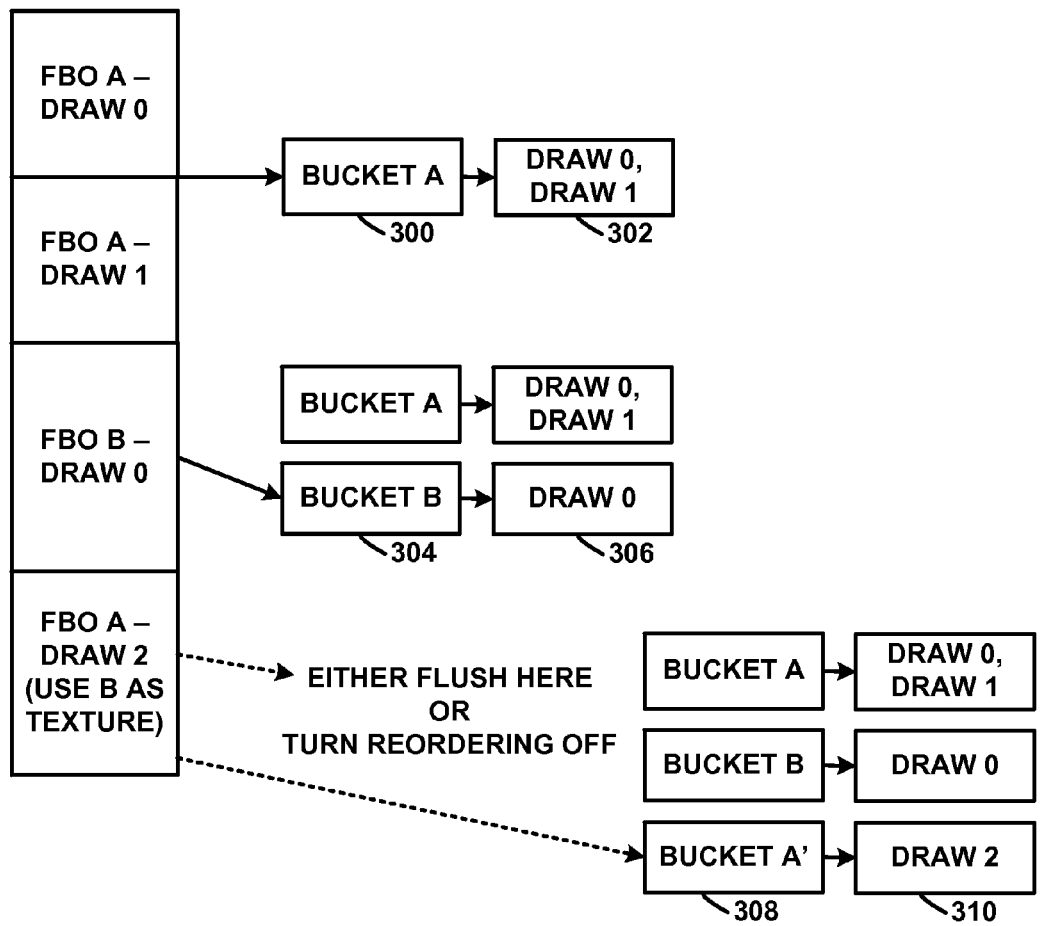
FIG. 6 is flow diagram illustrating another example command reordering process, consistent with the techniques of this disclosure.

FIG. 6 is flow diagram illustrating another example command reordering process, consistent with the techniques of this disclosure. In particular, the example of FIG. 6 illustrates an example in which a dependency occurs between render targets. For example, GPU 36 may receive a first rendering command for render target A (FBO A-draw 0) and a second rendering command for render target A (FBO A-draw 1). In response to receiving the commands, GPU 36 may generate a new bucket (bucket A) (300) and add the first and second rendering commands to the bucket (draw 0, draw 1) (302).

GPU 36 may then receive a first rendering command for render target B (FBO B-draw 0). In response to receiving the command, GPU 36 may generate a new bucket (bucket B) (304) and add the first rendering command to the bucket (draw 0) (306).

GPU 36 may then receive a third rendering command for render target A (FBO A-draw 2) that uses render target B as a texture. In this example, the third rendering command for render target A is dependent on render target B. As noted above, dependency may be identified if, upon reordering, a read timestamp associated with a current command occurs after a write timestamp associated with the command upon which the current command depends.

As an example for purposes of illustration, reordering the third rendering command of render target A (FBO A-draw 2) would cause the third rendering command of render target A to be added to bucket A. However, the third rendering command of render target A (FBO A-draw 2) depends on render target B. That is, the read timestamp associated with the third rendering command of render target A (FBO A-draw 2) occurs after the write timestamp associated with render target B, because the contents of render target B must be available for the third rendering command of render target A to be properly computed. Accordingly, GPU 36 may identify this dependency based on the timestamps and turn reordering off.

After turning reordering off, GPU 36 may either flush the command lists, or generate a new bucket (bucket A') (308) that includes the third rendering command of render target A (FBO A-draw 2) (310).

Figure 7:
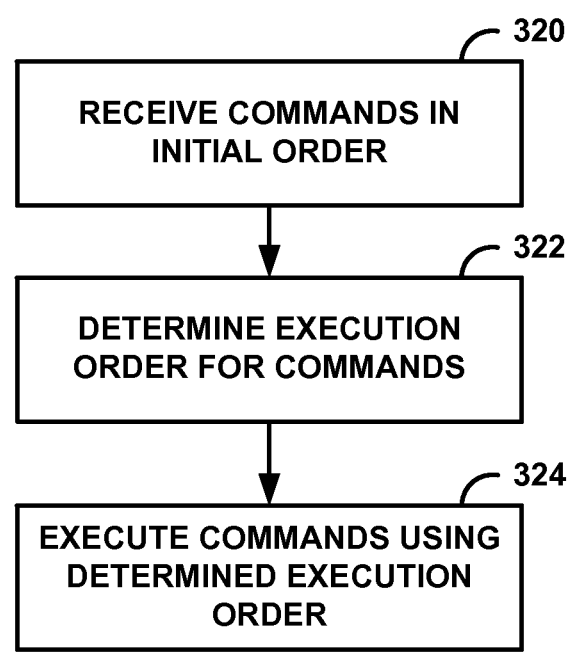
FIG. 7 is a flow diagram illustrating an example process for reordering commands, according to aspects of this disclosure.

FIG. 7 is a flow diagram illustrating an example process for reordering commands, according to aspects of this disclosure. While the process shown in FIG. 7 (and elsewhere in this disclosure) is described as being carried out by CPU 32 and/or GPU 36 (FIGS. 1 and 2), the techniques may be implemented by a variety of other processing units.

GPU 36 receives commands in an initial order (320). For example, GPU 36 may receive commands from GPU driver 50 in an order in which the commands are specified by a GPU program 52. The commands may include a plurality of rendering commands for a plurality of render targets.

According to aspects of this disclosure, GPU 36 may determine an execution order for the commands (322). In determining the execution order, GPU 36 may reorder one or more of the commands in a different order than the initial order based on data dependencies between commands. For example, as described herein, GPU 36 may generate per-render target command lists and may add rendering commands to the lists, provided the commands being added do not depend on the results of another command. Such independent commands (commands with no dependencies) may be reordered to eliminate unnecessary render target switching without more complex dependency tracking, thereby reducing the number of load and store operations that are performed by GPU 36.

GPU 36 may then execute the commands using the determined execution order (324). For example, GPU 36 may flush generated rendering command lists to a command buffer in the determined execution order. GPU 36 may then execute the commands from the command buffer, as is typically performed by GPU 36.

It should also be understood that, depending on the example, certain acts or events of any of the methods described herein can be performed in a different sequence, may be added, merged, or left out all together (e.g., not all described acts or events are necessary for the practice of the method). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored as one or more instructions or code on an article of manufacture comprising a non-transitory computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more DSPs, general purpose microprocessors, ASICs, FPGAs, or other equivalent integrated or discrete logic circuitry. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for rendering graphics data, the method comprising:
receiving a plurality of commands associated with a plurality of render targets for rendering an image, wherein commands of the plurality of commands are received in an initial order, wherein each render target of the plurality of render targets is a respective buffer, and wherein the image is composed of content from the plurality of render targets;
determining an execution order for the commands that is a different order than the initial order, wherein determining the execution order comprises generating respective per-render target command lists for each render target of the plurality of render targets based on data dependencies between render targets of the commands in the initial order;
adding the per-render target command lists to a command buffer in the determined execution order; and
executing the plurality of commands from the command buffer in the determined execution order.

2. The method of claim 1, wherein generating the per-render target command lists for each render target comprises, for each respective command of the plurality of commands:
when the respective command does not have a data dependency, adding the respective command to a per-render target command list based on a render target associated with the respective command; and
wherein executing the plurality of commands comprises executing the plurality of commands of the respective per-render target commands lists.

3. The method of claim 1, wherein generating the per-render target command lists for each render target comprises, for each respective command of the plurality of commands:
when the respective command does depend on a previous command, determining the execution order without reordering commands following the respective command in the initial order.

4. The method of claim 1, wherein determining the execution order comprises, for each respective command of the plurality of commands:
determining whether the respective command has an associated rendering mode that is different than previous commands in the initial order of the same render target of the respective command; and
when the respective command has an associated rendering mode that is different, determining the execution order without reordering the plurality of commands following the respective command in the initial order.

5. The method of claim 1, further comprising assigning a rendering mode to each of the per-render target command lists.

6. The method of claim 1, further comprising determining the data dependencies between the render targets based on one or more timestamps associated with the plurality of commands.

7. The method of claim 1,
wherein receiving the plurality of commands comprises receiving a first command of a first render target, receiving a second command of a second render target, and receiving a third command of the first render target;
wherein generating respective per-render target command lists based on the data dependencies comprises determining whether the third command of the first render target depends on a result of the second command of the second render target; and
when the third command does not depend on the second command, determining the execution order comprises reordering the third command and the second command such that executing the commands comprises executing the third command prior to the second command.

8. The method of claim 1, wherein generating the respective command lists comprises generating the respective per-render target command lists on a command-by-command basis.

9. The method of claim 8, wherein generating the respective command lists comprises adding respective commands of the respective render targets to the respective per-render target command lists in the initial order.

10. The method of claim 1, wherein receiving the plurality of commands comprises receiving a plurality of Application Programming Interface (API) commands.

11. The method of claim 1, wherein the plurality of commands are included in a command stream, and wherein generating the respective command lists comprises generating the respective commands lists without analyzing the entire command stream.

12. A device for rendering graphics data, the device comprising:
memory configured to store a plurality of commands associated with a plurality of render targets for rendering an image, wherein the image is composed of content from the plurality of render targets;
a plurality of buffers, wherein each render target of the plurality of render targets is a respective buffer of the plurality of buffers;
a command buffer; and
one or more processors configured to:
receive the plurality of commands associated with the plurality of render targets, wherein commands of the plurality of commands are received in an initial order;
determine an execution order for the commands that is a different order than the initial order, wherein determining the execution order comprises generating respective per-render target command lists for each render target of the plurality of render targets based on data dependencies between render targets of the commands in the initial order;
add the per-render target command lists to the command buffer; and
execute the plurality of commands from the command buffer in the determined execution order.

13. The device of claim 12, wherein to generate the per-render target command lists for each render target, the one or more processors are configured to, for each respective command of the plurality of commands:
when the respective command does not have a data dependency, add the respective command to a per-render target command list based on a render target associated with the respective command; and
wherein to execute the plurality of commands, the one or more processors are configured to execute the plurality of commands of the respective per-render target commands lists.

14. The device of claim 12, wherein to generate the per-render target command lists for each render target, the one or more processors are configured to, for each respective command of the plurality of commands:
when the respective command does depend on a previous command, determine the execution order without reordering commands following the respective command in the initial order.

15. The device of claim 12, wherein to determine the execution order, the one or more processors are configured to, for each respective command of the plurality of commands:
determine whether the respective command has an associated rendering mode that is different than previous commands in the initial order of the same render target of the respective command; and
when the respective command has an associated rendering mode that is different, determine the execution order without reordering the plurality of commands following the respective command in the initial order.

16. The device of claim 12, wherein the one or more processors are further configured to assign a rendering mode to each of the per-render target command lists.

17. The device of claim 12, wherein the one or more processors are further configured to determine the data dependencies between the render targets based on one or more timestamps associated with the plurality of commands.

18. The device of claim 12,
wherein to receive the plurality of commands, the one or more processors are configured to receive a first command of a first render target, receive a second command of a second render target, and receive a third command of the first render target;
wherein to generate respective per-render target command lists based on the data dependencies, the one or more processors are configured to determine whether the third command of the first render target depends on a result of the second command of the second render target; and when the third command does not depend on the second command, to determine the execution order, the one or more processors are configured to reorder the third command and the second command such that to execute the commands, the one or more processors are configured to execute the third command prior to the second command.

19. The device of claim 12, wherein the one or more processors are included in a graphics processing unit (GPU).

20. A device for rendering graphics data, the device comprising:
means for receiving a plurality of commands associated with a plurality of render targets for rendering an image, wherein commands of the plurality of commands are received in an initial order, wherein each render target of the plurality of render targets is a respective buffer, and wherein the image is composed of content from the plurality of render targets;
means for determining an execution order for the commands that is a different order than the initial order, wherein the means for determining the execution order comprises means for generating respective per-render target command lists for each render target of the plurality of render targets based on data dependencies between render targets of the commands in the initial order;
means for adding the per-render target command lists to a command buffer; and
means for executing the plurality of commands from the command buffer in the determined execution order.

21. The device of claim 20, wherein the means for generating the per-render target command lists for each render target comprises, for each respective command of the plurality of commands:
means for adding, when the respective command does not have a data dependency, the respective command to a per-render target command list based on a render target associated with the respective command; and
wherein the means for executing the plurality of commands comprises means for executing the plurality of commands of the respective per-render target commands lists.

22. The device of claim 20, wherein the means for generating the per-render target command lists for each render target comprises, for each respective command of the plurality of commands:
when the respective command does depend on a previous command, means for determining the execution order without reordering commands following the respective command in the initial order.

23. The device of claim 20, wherein the means for determining the execution order comprises, for each respective command of the plurality of commands:
means for determining whether the respective command has an associated rendering mode that is different than previous commands in the initial order of the same render target of the respective command; and
when the respective command has an associated rendering mode that is different, means for determining the execution order without reordering the plurality of commands following the respective command in the initial order.

24. The device of claim 20, further comprising means for assigning a rendering mode to each of the per-render target command lists.

25. The device of claim 20, further comprising means for determining the data dependencies between the render targets based on one or more timestamps associated with the plurality of commands.

26. A non-transitory computer-readable medium having instructions stored thereon that, when executed, cause one or more processors to:
receive a plurality of commands associated with a plurality of render targets for rendering an image, wherein commands of the plurality of commands are received in an initial order, wherein each render target of the plurality of render targets is a respective buffer, and wherein the image is composed of content from the plurality of render targets;
determine an execution order for the commands that is a different order than the initial order, wherein determining the execution order comprises generating respective per-render target command lists for each render target of the plurality of render targets based on data dependencies between render targets of the commands in the initial order;
add the per-render target command lists to a command buffer; and
execute the plurality of commands from the command buffer in the determined execution order.

27. The non-transitory computer-readable medium of claim 26, wherein to generate the per-render target command lists for each render target, the instructions cause the one or more processors to, for each respective command of the plurality of commands:
when the respective command does not have a data dependency, add the respective command to a per-render target command list based on a render target associated with the respective command; and
wherein to execute the plurality of commands, the instructions cause the one or more processors to execute the plurality of commands of the respective per-render target commands lists.

28. The non-transitory computer-readable medium of claim 26, wherein to generate the per-render target command lists for each render target, the instructions cause the one or more processors to, for each respective command of the plurality of commands:
when the respective command does depend on a previous command, determine the execution order without reordering commands following the respective command in the initial order.

29. The non-transitory computer-readable medium of claim 26, wherein to determine the execution order, the instructions cause the one or more processors to, for each respective command of the plurality of commands:
determine whether the respective command has an associated rendering mode that is different than previous commands in the initial order of the same render target of the respective command; and
when the respective command has an associated rendering mode that is different, determine the execution order without reordering the plurality of commands following the respective command in the initial order.

30. The non-transitory computer-readable medium of claim 26, wherein the instructions further cause the one or more processors to assign a rendering mode to each of the per-render target command lists.

* * * * *